US012226050B2

(12) United States Patent
Mercer et al.

(10) Patent No.: US 12,226,050 B2
(45) Date of Patent: Feb. 18, 2025

(54) TEMPERATURE CONTROLLED CHARCOAL GRILL AND SMOKER

(71) Applicant: Masterbuilt Manufacturing, LLC, Columbus, GA (US)

(72) Inventors: Daniel Mercer, Hamilton, GA (US); Caitlin McNulty, Columbus, GA (US); William A. Hardy, Phenix City, AL (US); John Darin McLemore, Hamilton, GA (US)

(73) Assignee: Premier Specialty Brands, LLC, Chamblee, GA (US)

( * ) Notice: Subject to any disclaimer, the term of this patent is extended or adjusted under 35 U.S.C. 154(b) by 724 days.

(21) Appl. No.: 17/476,188

(22) Filed: Sep. 15, 2021

(65) Prior Publication Data

US 2022/0079383 A1 Mar. 17, 2022

Related U.S. Application Data

(60) Provisional application No. 63/078,625, filed on Sep. 15, 2020.

(51) Int. Cl.
*A47J 37/07* (2006.01)
*A23B 4/052* (2006.01)
(Continued)

(52) U.S. Cl.
CPC ........... *A47J 37/0754* (2013.01); *A23B 4/052* (2013.01); *A23B 4/0523* (2013.01); *A47J 36/32* (2013.01);
(Continued)

(58) Field of Classification Search
CPC ............... A47J 37/0641; A47J 37/0635; A47J 37/0652; A47J 37/0754; A47J 37/0704; A23B 4/056; A23B 4/052; A23B 4/044
(Continued)

(56) References Cited

U.S. PATENT DOCUMENTS 5,191,831 A * 3/1993 Walden .................... A47J 27/16
99/481
2009/0320882 A1* 12/2009 Averwater .............. B08B 13/00
99/482
(Continued)

FOREIGN PATENT DOCUMENTS

KR 1020130072717 A * 7/2013 .......... A47J 37/0754
WO WO-2017220089 A1 * 12/2017 .......... A47J 37/0754

*Primary Examiner* — Reginald Alexander
(74) *Attorney, Agent, or Firm* — Miller & Martin PLLC

(57) ABSTRACT

The disclosed embodiments provide a temperature controlled charcoal grill and smoker that enables users to better control the cooking and smoking temperature relative to previous solutions. In some embodiments, for example, a user may place a divider in the interior of a fuel basket to coarsely adjust the amount and type of solid fuel used to heat a food-cooking enclosure of the temperature controlled charcoal grill and smoker. In addition, the user can also position a heat deflector tent above one or more heat transfer openings in a grease tray to further adjust the cooking and smoking temperature. Further still, the user can provide even finer control (including closed-loop control) over the cooking and smoking temperature using a controller that controls the speed of a fan that directs combustion air into the fuel basket.

20 Claims, 18 Drawing Sheets

(51) Int. Cl.
*A47J 36/32* (2006.01)
*A47J 37/06* (2006.01)
*A23B 4/044* (2006.01)

(52) U.S. Cl.
CPC ....... *A47J 37/0641* (2013.01); *A47J 37/0718* (2013.01); *A23B 4/044* (2013.01); *A23V 2002/00* (2013.01)

(58) Field of Classification Search
USPC .......................................... 99/446, 447, 482
See application file for complete search history.

(56) References Cited

U.S. PATENT DOCUMENTS

| | | | |
|---|---|---|---|
| 2015/0132456 A1* | 5/2015 | Cohen | A23B 4/052 99/482 |
| 2017/0265490 A1* | 9/2017 | McLamb | A23B 4/044 |
| 2018/0368617 A1* | 12/2018 | Allmendinger | A47J 37/0704 |
| 2021/0059469 A1* | 3/2021 | Wong | F24C 15/2014 |

\* cited by examiner

TEMPERATURE CONTROLLED CHARCOAL GRILL AND SMOKER

CROSS REFERENCE TO RELATED APPLICATION

The present application claims the benefit of priority under 35 U.S.C. § 119(e) to U.S. Provisional Application No. 63/078,625, entitled "Temperature Controlled Charcoal Grill and Smoker," filed Sep. 15, 2020, which is hereby incorporated by reference in its entirety as if fully set forth herein.

FIELD OF THE INVENTION

The present invention generally relates to grills and smokers, and more particularly, to grills and smokers that provide users with improved temperature control for cooking and smoking food within their cooking enclosures.

BACKGROUND OF THE INVENTION

Traditional grills and smokers use a solid fuel, such as charcoal, lump coal, or wood pellets positioned inside the food-cooking enclosure. Such grills and smokers typically control the temperature inside the food-cooking enclosure by means of a user's manual adjustments of vents and/or dampers on the grills and smokers.

The cooking and smoking temperature inside the cooking enclosure can be highly sensitive relative to the sizes of the vent openings selected by the user, often requiring trial and error (with feedback from an internal thermometer) to adjust the openings to achieve a desired internal temperature. In addition, the temperature within the cooking chamber is also highly dependent on the amount and distribution of the charcoal or wood fuel positioned in the grill or smoker. Managing both the fuel burning and air flow within the cooking enclosure can be a difficult process for inexperienced users trying to control the cooking or smoking temperature.

Temperature control in vertical grills and smokers can be especially difficult. The cooking enclosure of a vertical grill or smoker typically comprises multiple cooking racks and one or more hooks on which various different types of food products can be loaded. By stacking food onto the cooking racks and hooks, vertical grills and smokers can be used to cook or smoke more food products at the same time as compared with conventional grills and smokers with only a horizontal cooking surface. Vertical grills and smokers are also more space efficient, since they generally have a smaller footprint and require less space on a deck or patio. In operation, fuel combusts at the bottom of the vertical grill and smoker, and the generated heat and/or smoke rises over a relatively large distance to an exhaust opening near the top of the cooking enclosure. It can be difficult for users of such grills and smokers to control or avoid a temperature gradient between the bottom and top of the vertical cooking enclosure. This can result in food products on different cooking racks and hooks being exposed to inconsistent and/or uneven temperatures.

There is therefore a need in the art for improved grills and smokers, including vertical grills and smokers, that would allow users to more easily control the temperature of the cooking enclosure when operating the grill or smoker.

SUMMARY OF THE INVENTION

The disclosed embodiments provide a temperature controlled charcoal grill and smoker that enables users to better control the cooking and smoking temperature relative to previous solutions. In the disclosed embodiments, the temperature controlled charcoal grill and smoker has a cabinet with an upper food-cooking enclosure and a lower fuel enclosure. The upper food-cooking enclosure may comprise cooking racks and/or hooks for use as a vertical grill and smoker. A grease tray with one or more heat transfer openings separates the upper food-cooking enclosure from the lower fuel enclosure in the cabinet. The heat transfer opening(s) allow smoke and heat to enter the upper food-cooking enclosure from the fuel enclosure below.

In the exemplary embodiments, a top door on the front of the cabinet may provide a user with access to the interior of the upper food-cooking enclosure. The upper food-cooking enclosure may comprise vertically spaced grill racks, a water pan, and at least one temperature sensor. An exhaust opening in the back of the cabinet, near the top of the cabinet, allows smoke and heat to escape from the upper food-cooking enclosure as fresh smoke and hot air enters the upper food-cooking enclosure through the heat transfer openings in the grease tray.

A bottom door on the front of the cabinet may provide a user with access to the interior of the lower fuel enclosure. The fuel enclosure includes a fuel grate in the form of a basket with an open top and holes on each of its side walls and bottom surface. Thus, the fuel grate equivalently may be referred to herein as a fuel basket. In some embodiments, the fuel grate is substantially shaped as a rectangular basket. A user may remove the fuel basket, load it with a solid fuel, such as lump charcoal or charcoal briquettes, and then insert the loaded fuel basket back into the lower fuel enclosure through the bottom door. In some embodiments, the fuel basket may be nested inside an ash bowl that catches the ashes from the solid fuel, such as charcoal, as it burns in the fuel basket. The ash bowl with the nested fuel basket may be removed as a single unit through the bottom door of the lower fuel enclosure. For example, the ash bowl with the nested fuel basket may be positioned on a removable tray in the lower fuel enclosure.

In some embodiments, a user may place a hollow divider into the interior of the fuel basket before adding the solid fuel. The divider is configured to partition the interior of the fuel basket into at least two sections where solid fuel may be placed in the basket. In one mode of operation, wood chunks to add smoke flavor may be placed inside at least one interior section of the hollow divider and charcoal may be placed outside of the divider in the fuel basket. In certain embodiments, the divider is substantially rectangular shaped, whereby the user may place solid fuel (such as wood) in the center of the rectangular divider and other solid fuel (such as charcoal) may be positioned outside of the divider in the fuel basket. The divider may have a pair of substantially parallel solid sides configured to generally extend along the direction of the length of the fuel basket, another pair of solid sides that form closed ends of the divider, an open bottom, and an open top. Those skilled in the art will appreciate that other divider shapes are possible, for example, using any closed or open polygon shapes, so long as solid fuel may be placed within one or more interior sections of the divider and also outside of the divider after the user has positioned the divider inside the fuel basket.

Insertion of the hollow divider into the fuel basket may allow for rough adjustment of the cooking or smoking temperature, for example by limiting an amount of solid fuel that may be placed in the fuel basket. In some embodiments, up to 16 pounds of charcoal briquettes may be loaded into the fuel basket to achieve cooking and smoking temperatures above 275 degrees Fahrenheit in the food-cooking enclosure. For cooking temperatures below 275 degrees Fahrenheit, up to 12 pounds of charcoal briquettes may be loaded into the fuel basket. Besides controlling the amount of solid fuel in the fuel basket, with or without using the divider, the user can further control the temperature inside the food-cooking enclosure by selectively covering and uncovering the heat transfer openings in the grease tray and/or using a controller to select an appropriate speed of a fan as discussed below.

For example, to control the temperature within the upper food-cooking enclosure, combustion air from a fan may be directed into the fuel basket. The output of the fan may be connected to an air duct or manifold, which in some embodiments, directs the fan's air flow into an air column having an outlet in close proximity to the fuel basket. In some embodiments, the outlet may include one or more air deflectors configured to channel the air flow from the fan directly into the fuel basket during combustion of the solid fuel. The air column may be located within the lower fuel enclosure and adjacent to one side of the fuel basket.

In addition, the user also may control the temperature within the food-cooking enclosure by placing a heat deflector tent over the heat transfer openings in the grease tray. In some embodiments, the heat deflector tent may be generally shaped like a table having a substantially flat surface and a set of legs for supporting the surface. For cooking or smoking at high temperatures, the heat deflector tent may be mounted on the grease tray with its legs extending downwards toward the grease tray so that the heat tent's flat surface is elevated above the heat transfer openings. Alternatively, for cooking or smoking at lower temperatures, the heat deflector tent may be mounted on the grease tray in an upside-down orientation such that its substantially flat surface may directly contact the grease tray and covers at least a portion of the heat transfer openings. In this latter configuration, the heat deflector tent allows less heat and/or smoke to pass through the heat transfer openings into the food-cooking enclosure.

In accordance with the disclosed embodiments, the temperature in the food-cooking enclosure also may be adjusted by controlling a fan configured to blow combustion air into the fuel basket. For example, a controller coupled to the grill and smoker may be configured to receive a cooking temperature input from the user, monitor the temperature in the food-cooking enclosure by means of at least one temperature sensor, and control a speed of the fan to thereby control the amount of combustion air forced into the fuel basket. The fan also may be interlocked with the top and/or bottom doors so the fan is turned off if the door has been opened. At the end of the cooking or smoking process, the user may use the controller to turn up the temperature in the food-cooking enclosure (e.g., by increasing the fan speed) to allow the solid fuel to burn out in the fuel basket.

The controller may be a hardware module or other control unit that is either permanently or removably attached to the grill and smoker. The controller may comprise a control panel with one or more user-interface elements, such as hardware and/or software components, that allow a user to select a desired cooking or smoking temperature. In some embodiments, the controller may include a display unit, which may comprise a touch screen. In accordance with the disclosed embodiments, the control panel can be integrated with the controller or otherwise coupled to the controller. In some embodiments, the controller may comprise an oil capillary tube that controls an electronic switch configured to turn on and off the fan. For example, the oil capillary tube may be positioned within the grill and smoker and may be configured to close the electronic switch, thus turning on the fan, when the temperature in the grill and smoker is below a certain threshold temperature. Similarly, the oil capillary tube may be configured to open the electronic switch, turning off the fan, when the temperature in the grill and smoker exceeds the threshold temperature. The controller could also comprise or control other types of electronic switches, relays, or other controllers for turning on and off the fan.

The controller may be configured to communicate with one or more remote devices (such as phones, tablets, laptops, desktops, wearable devices, or any other user devices) over wireless connections. In such embodiments, the user may input information to send to the controller using an application executing on a mobile device. The mobile device may transmit this user-inputted information to the control unit over a direct wireless link (such as using Bluetooth or another peer-to-peer wireless protocol) or, alternatively, through a wireless network (such as an 802.11 wireless network) to which both the controller and mobile device are connected. The controller may be configured to transmit information back to the mobile device for display to the user. In some embodiments, the controller unit also may be configured to communicate information over a wireless network to one or more remote computers, for example, in a cloud-computing platform. For example, the controller may transmit information about the grill and smoker to a cloud service and/or receive recommendations or instructions from the cloud service, for instance, about how to optimize control of the fan speed for precisely controlling the temperature inside food-cooking enclosure.

Advantageously, the temperature controlled grill and smoker in the disclosed embodiments provides a multifaceted solution for controlling the cooking and smoking temperature in a food-cooking enclosure, for example, in vertical grills and smokers. As noted above, a user may place a divider in the fuel basket to coarsely adjust the amount and type of solid fuel used to heat the food-cooking enclosure. In addition, the user can also position the heat tent above the one or more heat transfer openings in the grease tray to further adjust the cooking and smoking temperature. Further still, the user can provide finer control (including closed-loop control) over the cooking and smoking temperature using a controller that controls the speed of a fan that directs combustion air into the fuel basket.

The present disclosure is merely exemplary of certain embodiments of the present invention. Further objects, features, and advantages will become apparent upon consideration of the following detailed description of the exemplary embodiments when taken in conjunction with the drawings and the appended claims.

BRIEF DESCRIPTION OF THE DRAWINGS

The particular features and advantages of the invention will become apparent from the following description taken in connection with the accompanying drawings in which like reference numbers indicate identical or functionally similar elements. The following figures depict details of disclosed embodiments. The invention is not limited to the precise arrangement shown in these figures, as the accompanying drawings are provided merely as examples.

DETAILED DESCRIPTION OF THE DISCLOSED EMBODIMENTS

Figure 1:
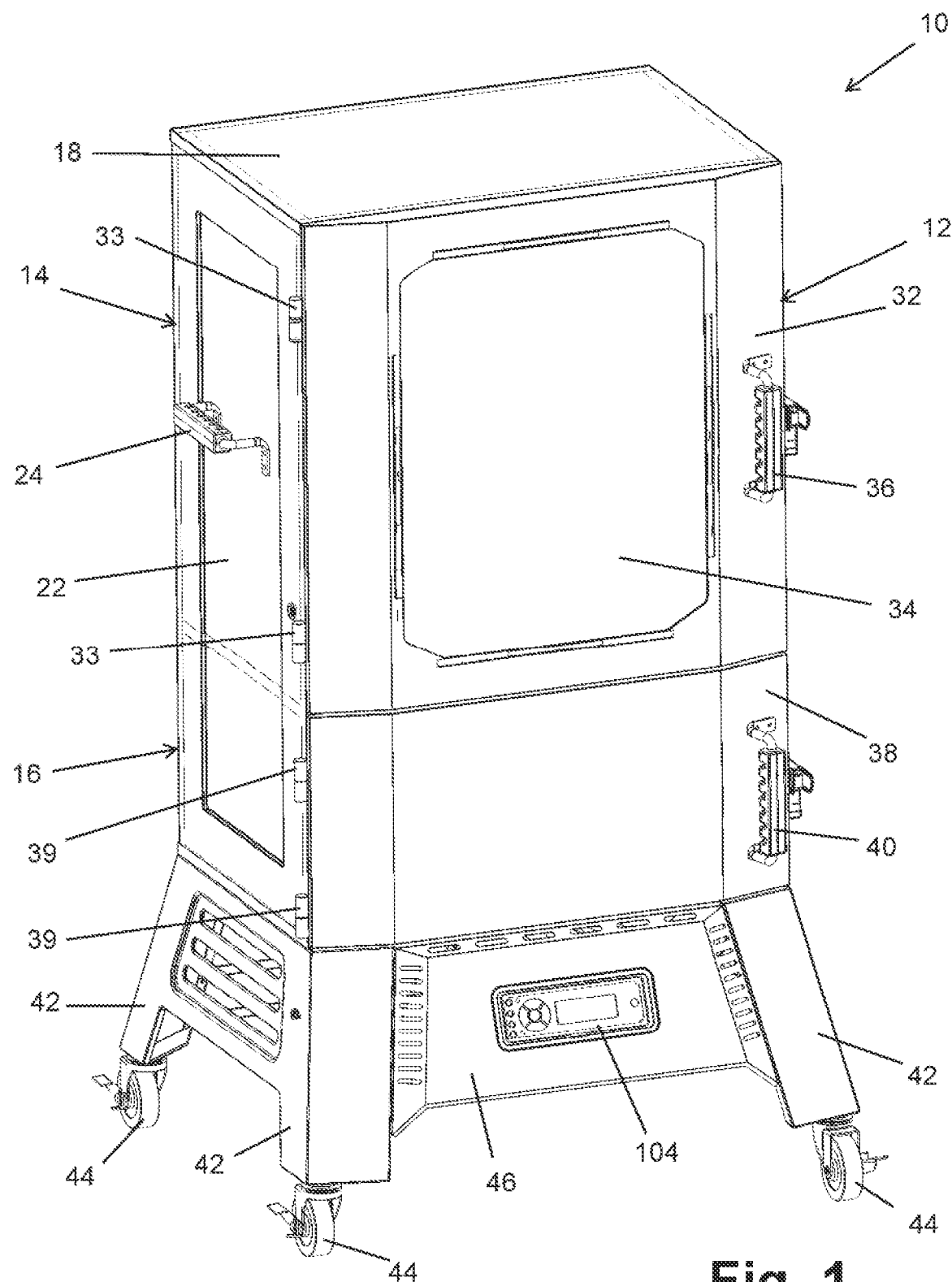
FIG. 1 is a front perspective view of a temperature controlled charcoal grill and smoker in accordance with certain exemplary embodiments of the present invention.
Figure 2:
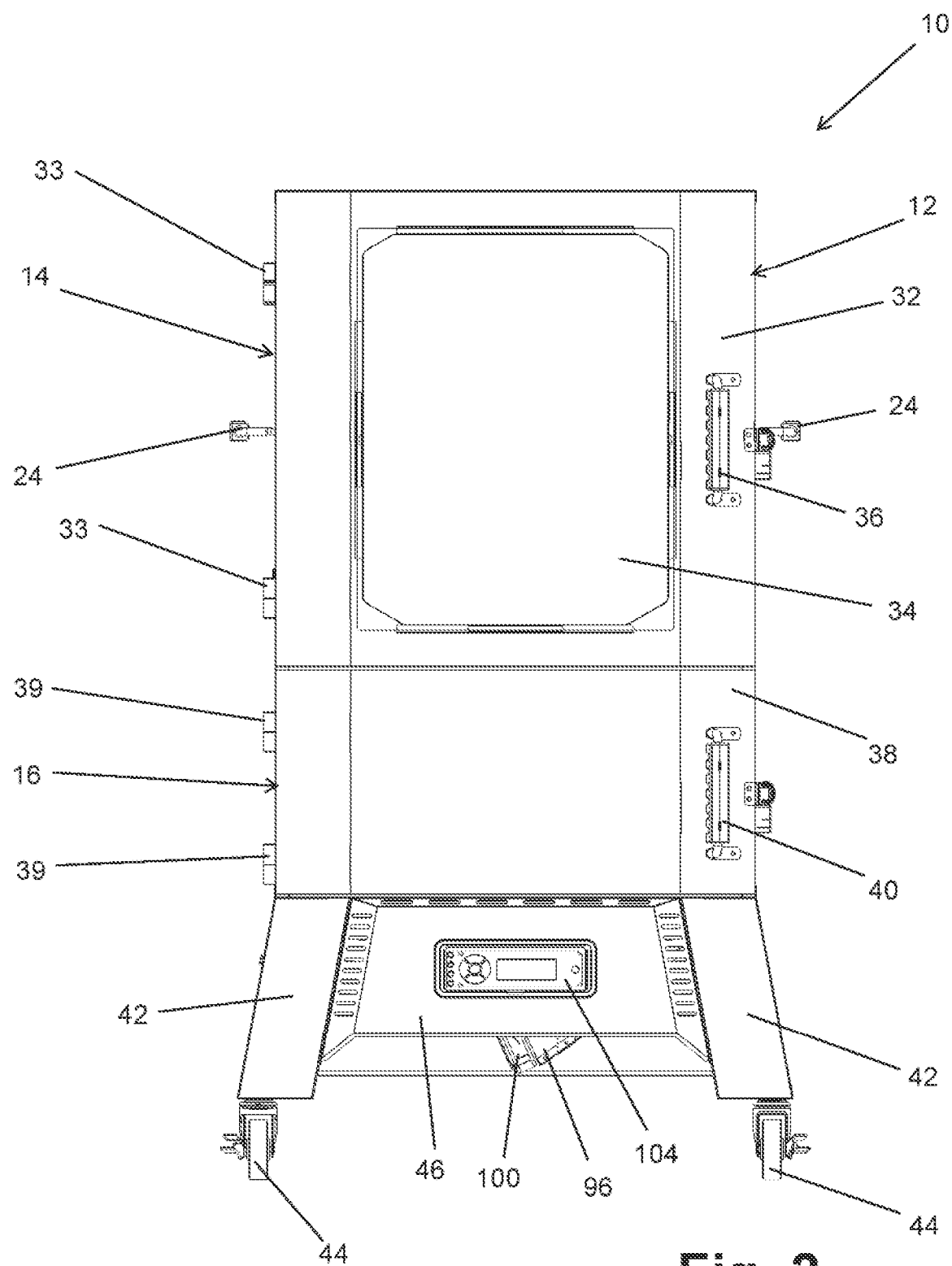
FIG. 2 is a front elevation view of the temperature controlled charcoal grill and smoker in accordance with certain exemplary embodiments of the present invention.
Figure 3:
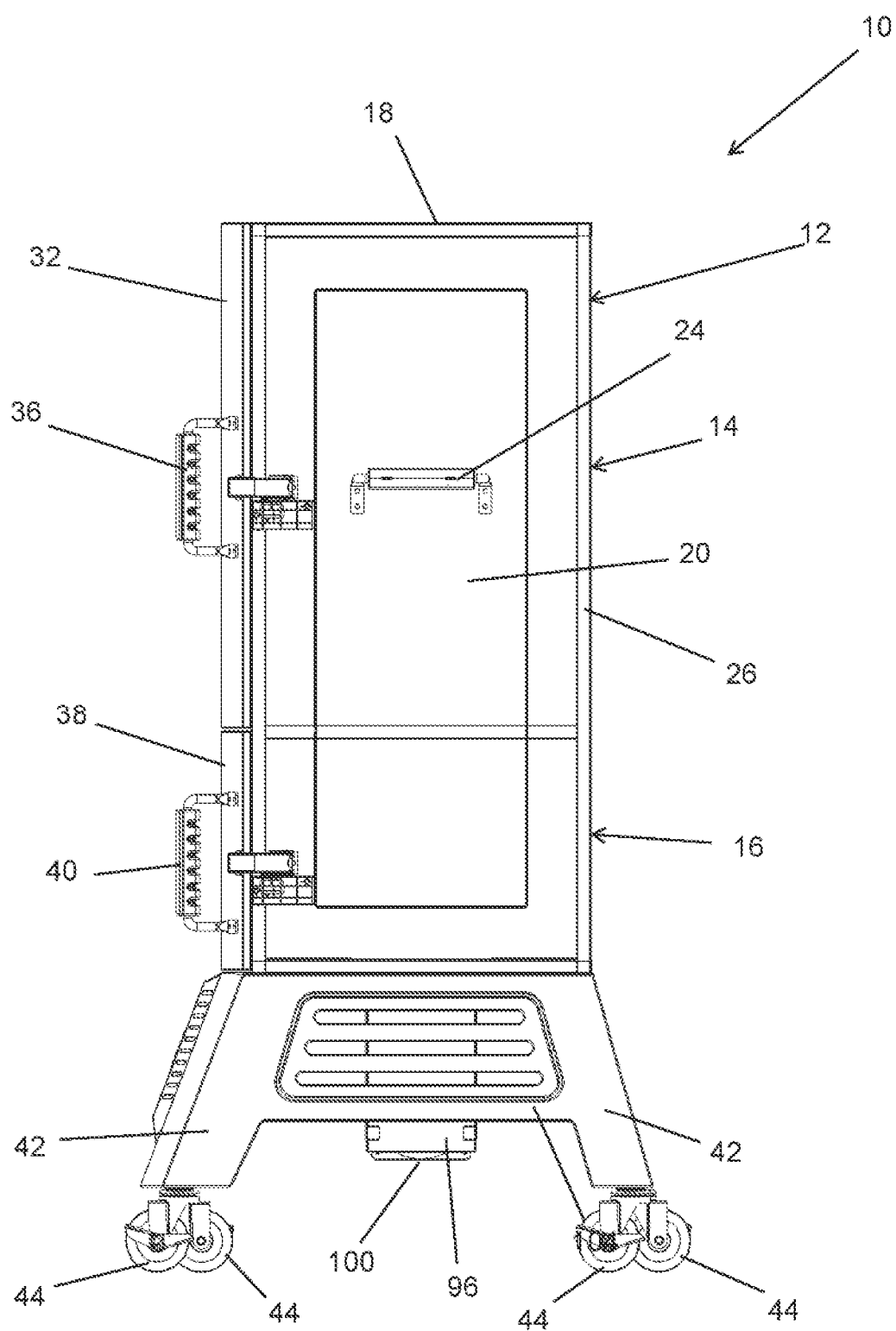
FIG. 3 is a right side elevation view of the temperature controlled charcoal grill and smoker in accordance with certain exemplary embodiments of the present invention.
Figure 4:
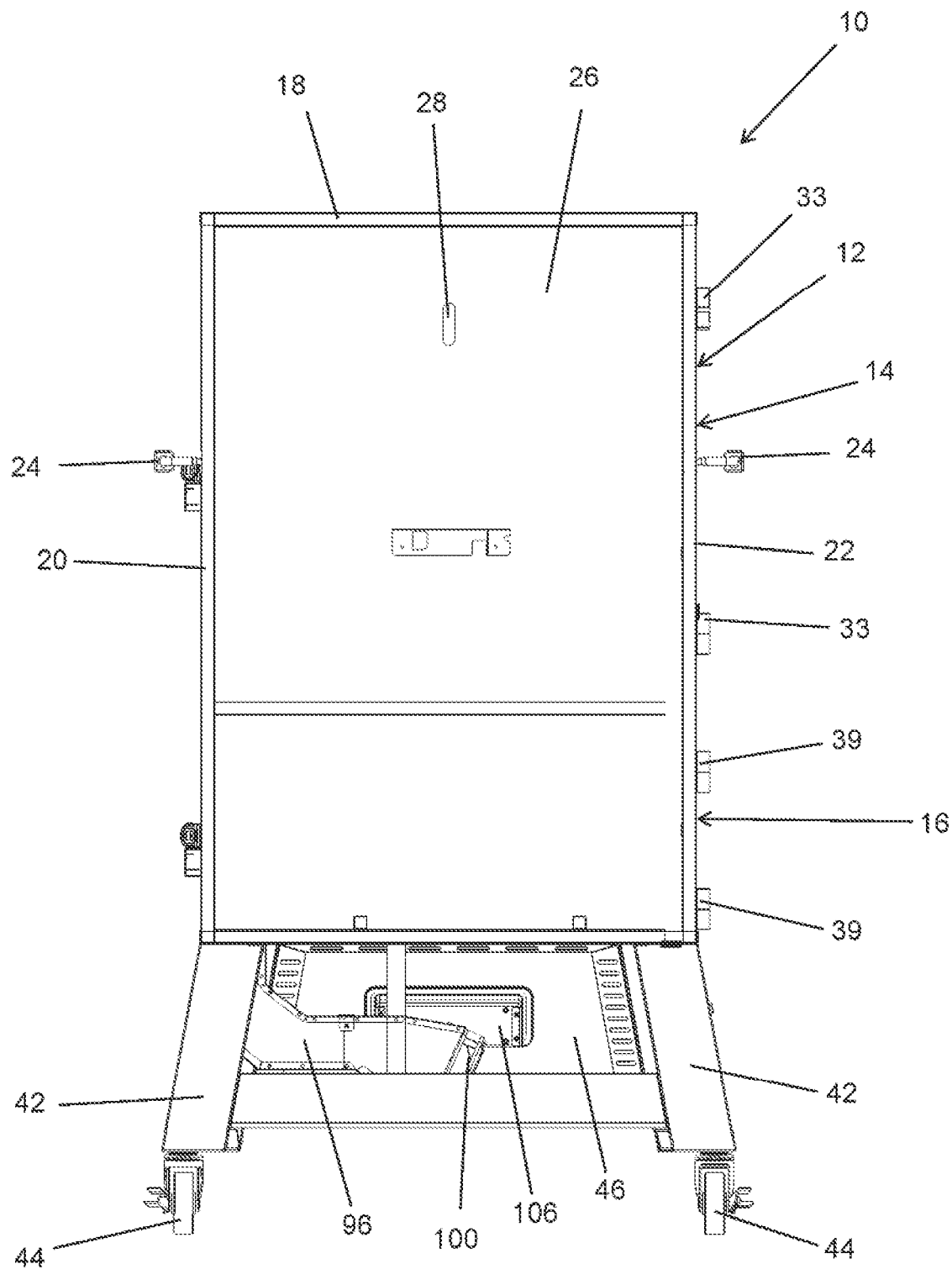
FIG. 4 is a back elevation view of the temperature controlled charcoal grill and smoker in accordance with certain exemplary embodiments of the present invention.
Figure 5:
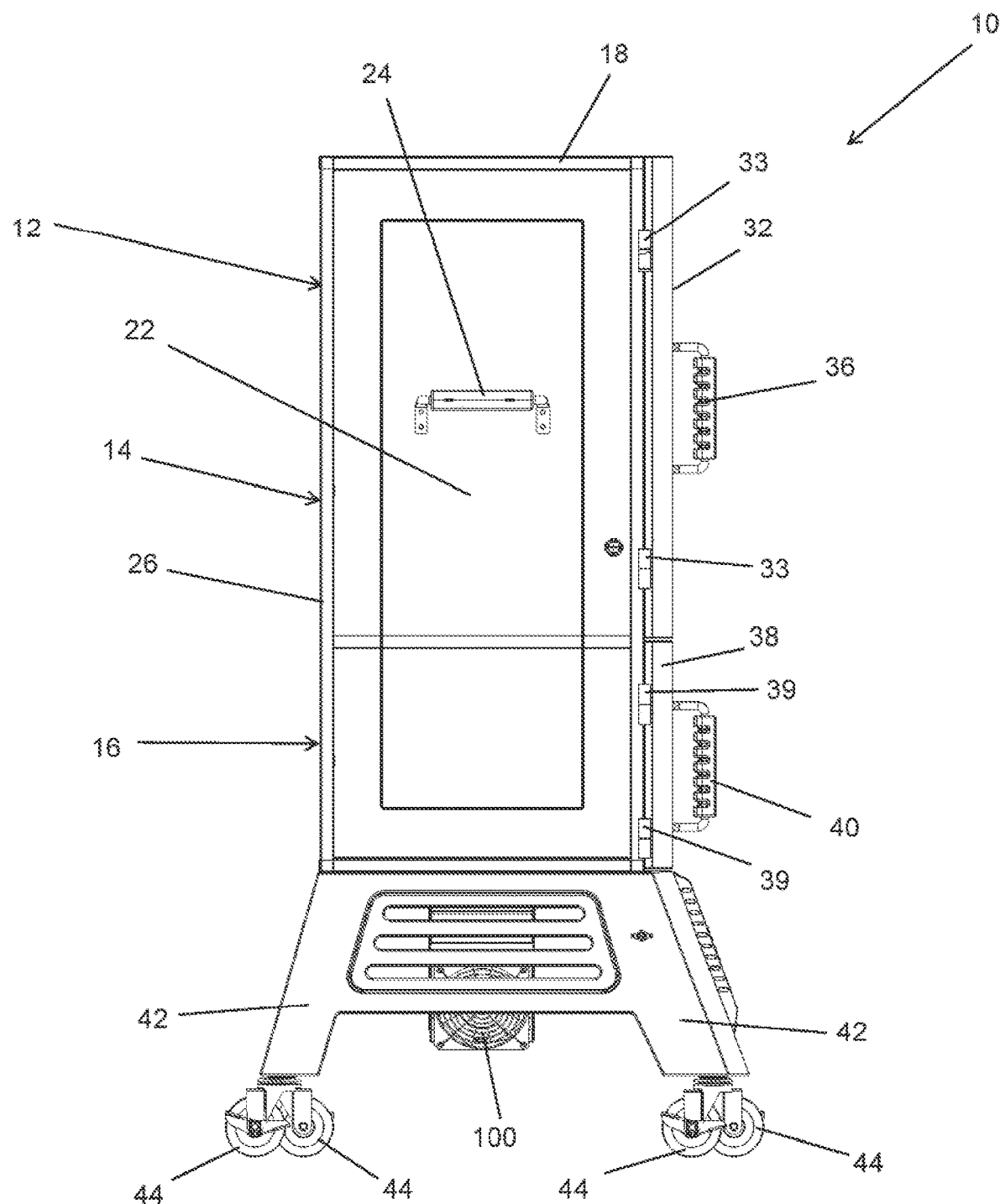
FIG. 5 is a left side elevation view of the temperature controlled charcoal grill and smoker in accordance with certain exemplary embodiments of the present invention.
Figure 6:
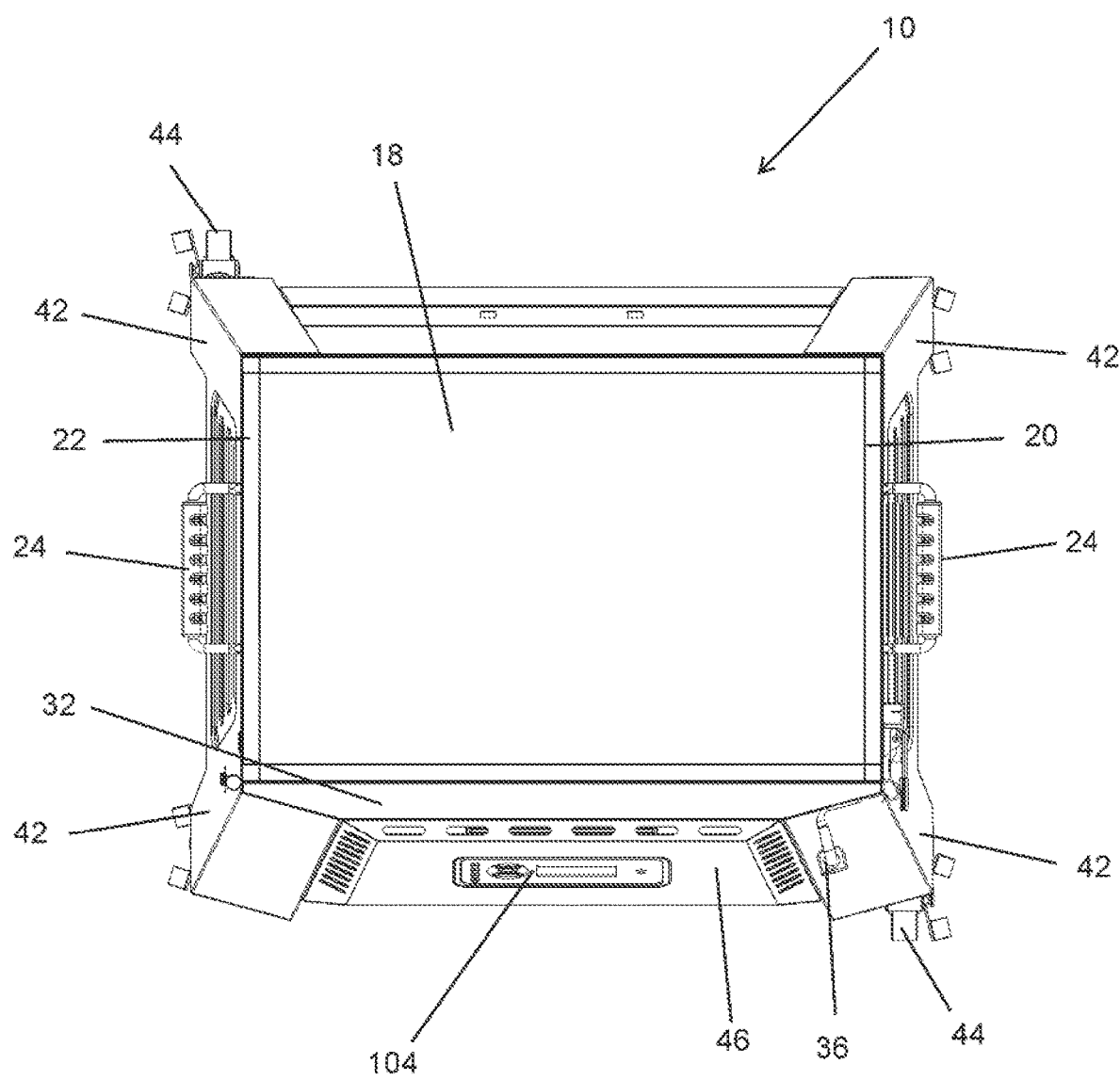
FIG. 6 is a top plan view of the temperature controlled charcoal grill and smoker in accordance with certain exemplary embodiments of the present invention.
Figure 7:
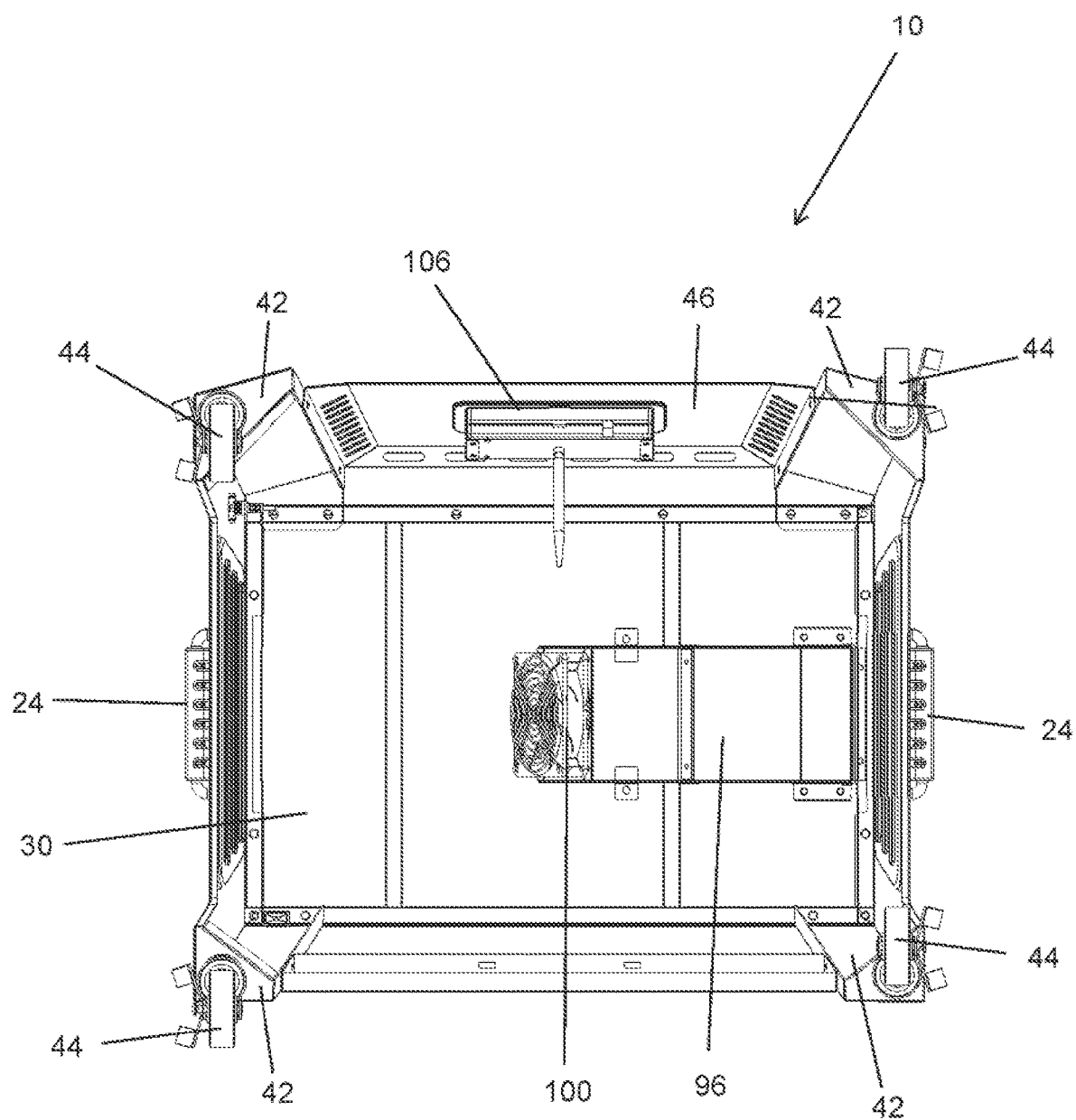
FIG. 7 is a bottom plan view of the temperature controlled charcoal grill and smoker in accordance with certain exemplary embodiments of the present invention.

FIGS. 1-16 show various views of an exemplary grill and smoker, such as a vertical grill and smoker, that may be used in accordance with the disclosed embodiments of the invention. In this disclosed embodiment, a temperature controlled charcoal grill and smoker 10 has a cabinet 12 with an upper food-cooking enclosure 14 and a lower fuel enclosure 16. A grease tray 56 with heat transfer openings 62 separates the upper food-cooking enclosure 14 from the lower fuel enclosure 16. The heat transfer openings 62 allow smoke and heat to enter the upper food-cooking enclosure 14 from the lower fuel enclosure 16 below.

The cabinet 12 includes a top 18, a bottom 30, a right side 20, a left side 22, and a back 26. The cabinet 12 is supported on legs 42. The legs 42 may optionally have wheels 44 as illustrated in FIG. 1. Handles 24 are attached to the right side 28 and the left side 22 so that the user can move the grill and smoker 10 on the wheels 44.

In this exemplary embodiment, a top door 32 mounted on hinges 33 with a handle 36 provides access to the upper food-cooking enclosure 14. The top door 32 has a window 34 so that the user can view the food in the upper food-cooking enclosure 14 without opening the top door 32. The upper food-cooking enclosure 14 includes, for instance, vertically spaced grill racks 48, a water pan 54 supported on a water pan rack 52, and at least one temperature sensor 102. One or more exhaust openings 28 in the back 26 of the cabinet 12 near the top 18 of the cabinet 12 allow smoke and heat to escape from the upper food-cooking enclosure 14 as fresh smoke and heat enters the food-cooking enclosure 14 through the heat transfer openings 62 in the grease tray 56.

Further to this exemplary embodiment, a bottom door 38 mounted on hinges 39 with a handle 40 on the front of the cabinet provides access to the lower fuel enclosure 16. The lower fuel enclosure 16 includes a solid-fuel grate 68 (e.g., charcoal grate) in the form of a rectangular basket with an open top and holes 70 on each of its sides 72, left end 74, right end 76, and bottom 78. Those skilled in the art will appreciate that various patterns and arrangements of holes 70 may be used on the sides and bottom of the fuel basket 68; for example, any of the sides 72, left end 74, right end 76, and bottom 78 may employ the same or different arrangements of holes relative to the other surfaces of the fuel basket. In the disclosed embodiment, the sides 72 and the bottom 78 may be formed of metal plates with stamped holes 70. The ends 74 and 76 may be formed of expanded metal. The grate holes 70 result in the fuel basket 68 having sufficient open space to permit ash generated by the combustion of solid fuel to pass from inside of the fuel basket 68 into a surrounding ash bowl 108. In some embodiments, for example, the grate holes 70 may result in the fuel basket 68 having around 34% open space taking into account the holes in all of its side and bottom surfaces. The percentage of open space in the fuel basket 68 can be increased or decreased as necessary depending on the application, including, but not limited to, the fuel basket 68 having open space of around 30% to 40%, 20% to 40%, 40% to 50%, at least 20%, at least 30%, at least 40%, or at least 50%.

In an illustrative mode of operation shown in FIGS. 8-11 and 13A-16, an area or volume inside the fuel basket 68 may be divided into two sections by a substantially rectangular-shaped hollow divider 82, e.g., resulting in separate regions inside and outside the divider. The divider 82 has two solid sides preferably extending in a direction substantially parallel to the length of the fuel basket 68 and may slightly converge toward the right end 76 of the fuel basket 68. Thus, the shape of the divider 82 may be trapezoidal rather than perfectly rectangular. More generally, the divider 82 has solid ends, an open top, and an open bottom. Wood chunks or wood chips to add smoke flavor may be placed inside the interior region of the divider 82 and charcoal may be placed around the outside perimeter of the divider within the fuel basket 68.

While the shape of the divider 82 may be a quadrilateral, such as generally rectangular, square, or trapezoidal, those skilled in the art will appreciate that other divider shapes are also possible. For instance, in some embodiments, the divider 82 can comprise solid walls in the shape of any polygon or other shape, with an open top and open bottom, that defines separate regions where the user can place solid fuel in the fuel basket 68.

The fuel basket 68 with the divider 82 is nested inside an ash bowl 108 that catches the ashes from the charcoal or other fuel as it burns in the fuel basket 68 and passes through the openings 70 in the walls and bottom of the fuel basket 68. The ash bowl 108 with the nested fuel basket 68 can be removed as a single unit through the bottom door 38 of the lower fuel enclosure 16, for example, by positioning the ash bowl with nested fuel grate on a removable tray that a user can access through the bottom door 38.

Figure 8:
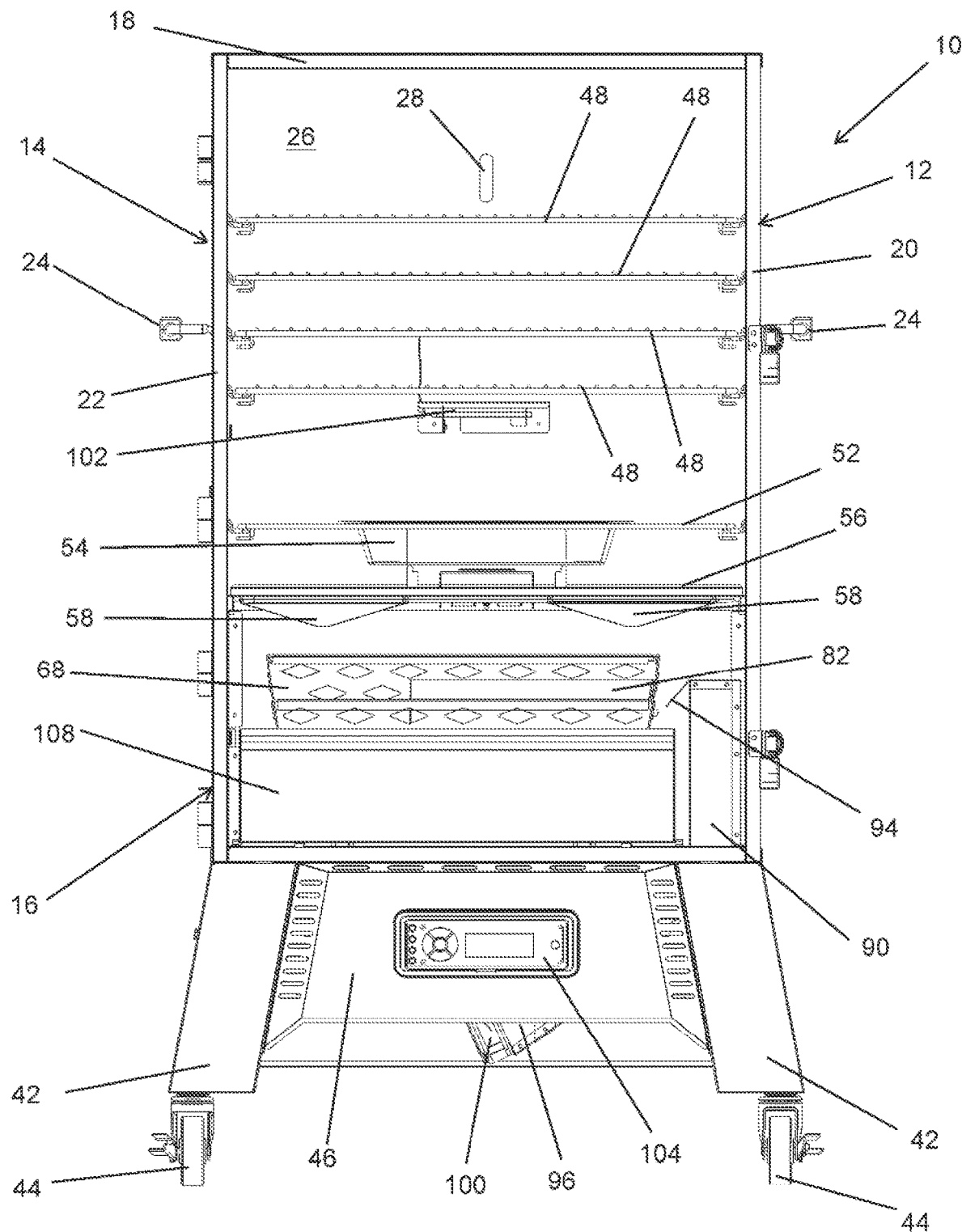
FIG. 8 is a front elevation view of the temperature controlled charcoal grill and smoker with the doors removed to show internal details in accordance with the present invention.
Figure 9:
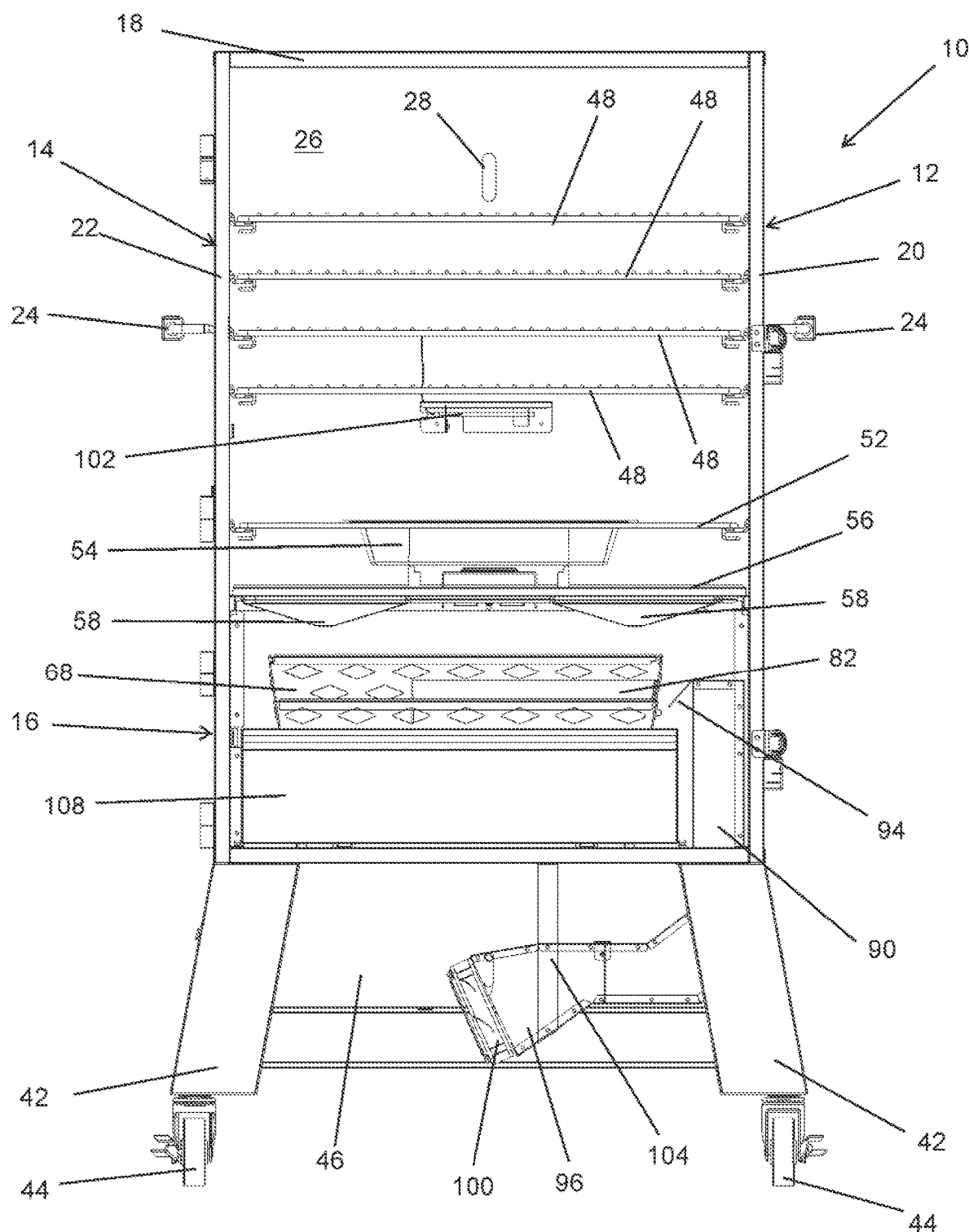
FIG. 9 is a front elevation view of the temperature controlled charcoal grill and smoker with the doors and front panel removed to show internal details in accordance with certain exemplary embodiments of the present invention.
Figure 10:
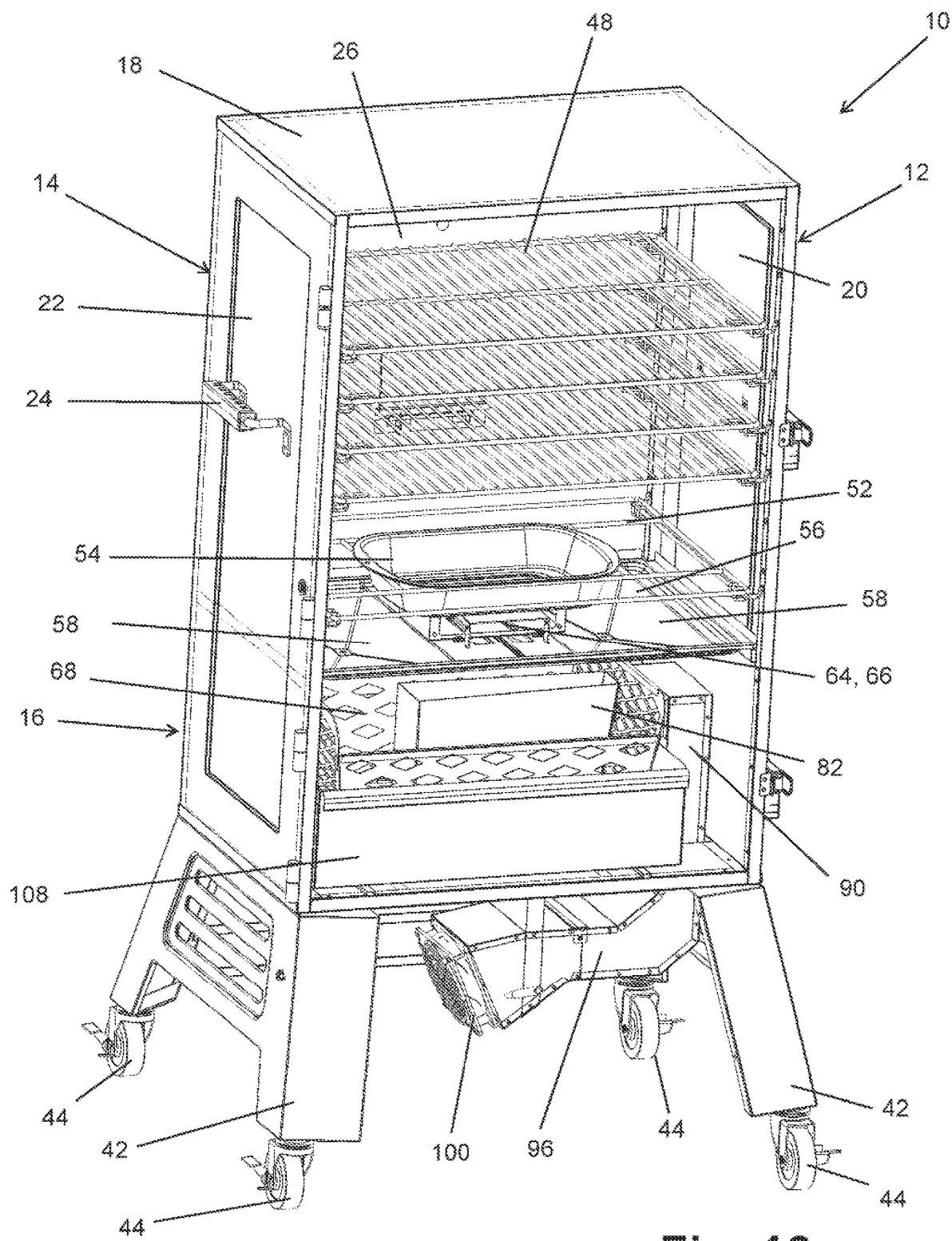
FIG. 10 is a front perspective view of the temperature controlled charcoal grill and smoker with the doors and control panel removed to show internal details in accordance with certain exemplary embodiments of the present invention.
Figure 11:
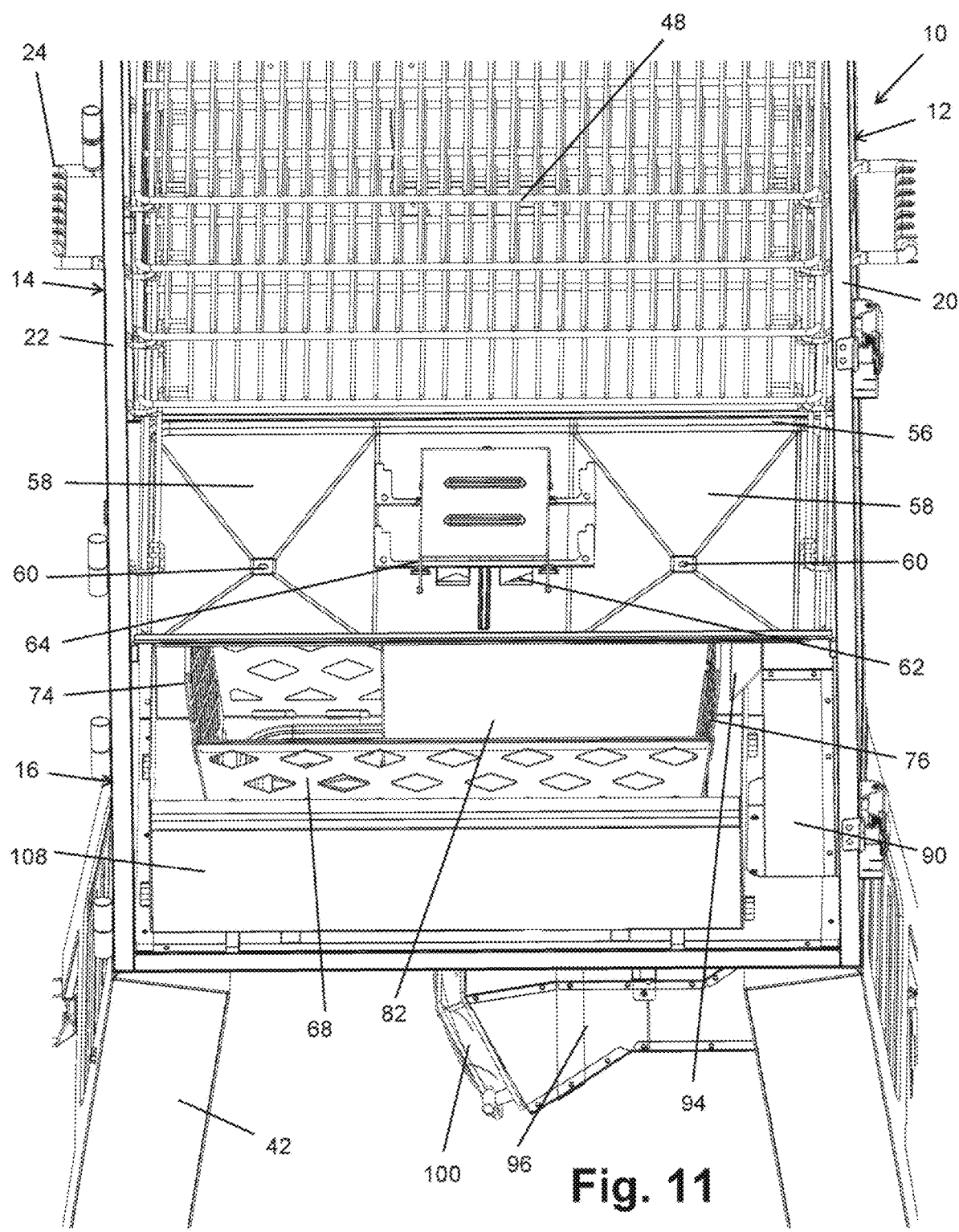
FIG. 11 is an enlarged front perspective view of the temperature controlled charcoal grill and smoker with the doors and control panel removed to show internal details in accordance with certain exemplary embodiments of the present invention.
Figure 12:
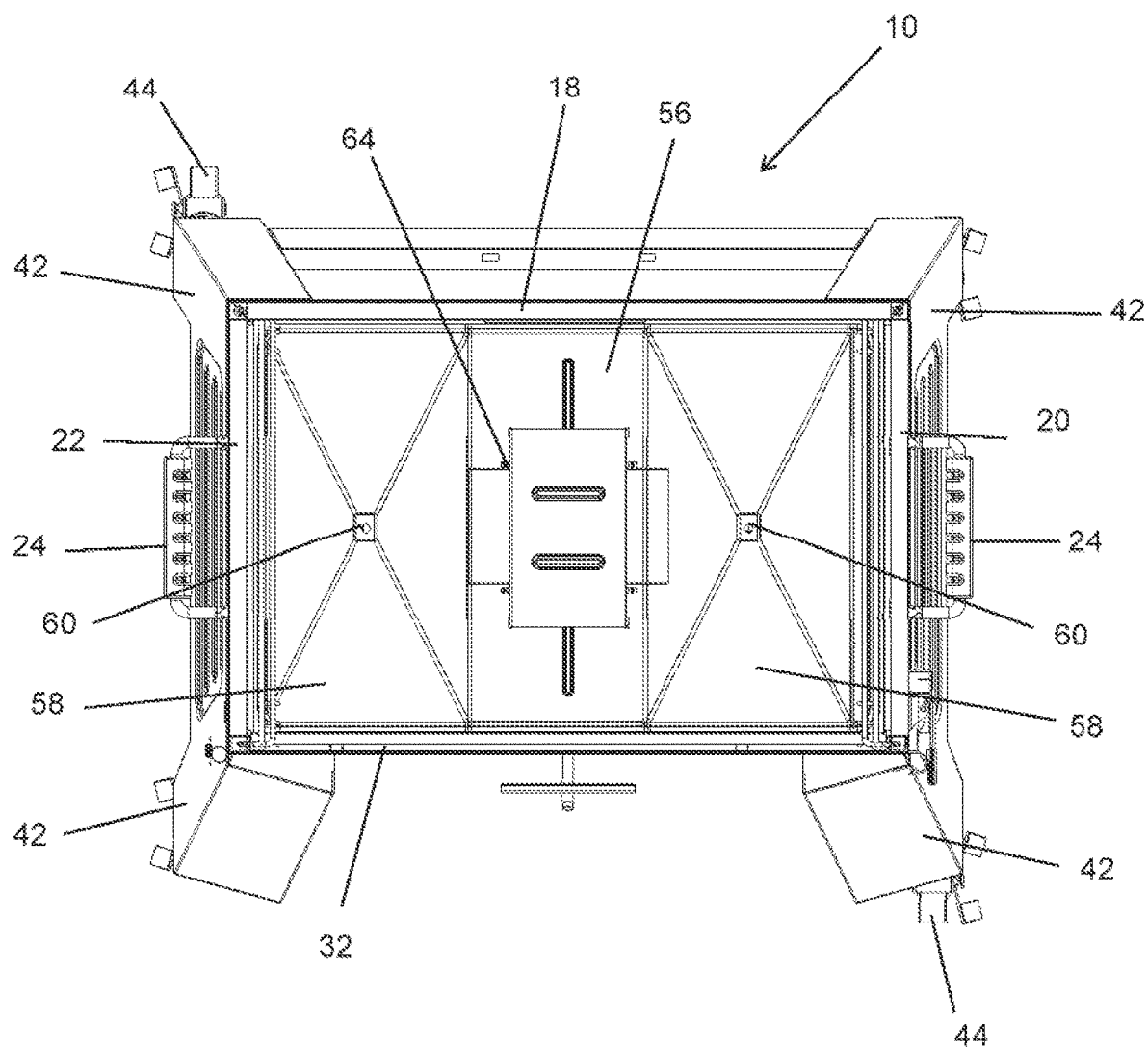
FIG. 12 is a top plan view of the of the temperature controlled charcoal grill and smoker with the top, grill racks, water pan rack, and water pan removed to show internal details in accordance with certain exemplary embodiments of the present invention.

In some embodiments, a water pan 54 may be mounted on a water pan rack 52 in the upper food-cooking enclosure 14 above the grease tray 56. The water pan 54 provides moisture to the food cooking in the upper food-cooking enclosure 14 so that the food will not dry out during extended cooking or smoking processes. In some embodiments, the water pan 54 may be seated in an opening of the water pan rack 52 or may be configured to hang down from the water pan rack 52, for example as FIGS. 8-10 show. Alternatively, the water pan 54 may be placed on a top surface of the water pan rack 52.

The grease tray 56 separates the upper food-cooking enclosure 14 from the lower fuel enclosure 16 of the cabinet 12. The grease tray 56 may include one or more grease tray bowls 58, each having a drain 60. The drains 60 are used to collect the grease drippings and direct them into the fire where the drippings are burned off. The grease tray 56 also includes one or more heat transfer openings 62 that allow heat and smoke from the lower fuel enclosure 16 to enter the upper food-cooking enclosure 14.

With reference to FIGS. 13A-16, air is supplied to the fuel basket 68 by a fan 100. In this exemplary embodiment, the fan 100 delivers air through an air duct or manifold 96 to an air column 90. The air column 90 has one or more air column openings 92 adjacent the right end 76 of the fuel basket 68. An air deflector 94 above the one or more air column openings 92 directs the air from the fan 100 downward toward the right end 76 of the fuel basket 68. In some embodiments, a flexible damper 98 may be positioned in the duct or manifold 96. The air pressure created by the fan 100 opens the damper 98 to allow air to flow through the manifold, to the air column 90, and out of the air column opening 92. At the end of the cooking process, the user may turn up the temperature on the control panel 104 to allow the fuel, such as charcoal, in the fuel basket 68 to burn out.

Figure 13A:
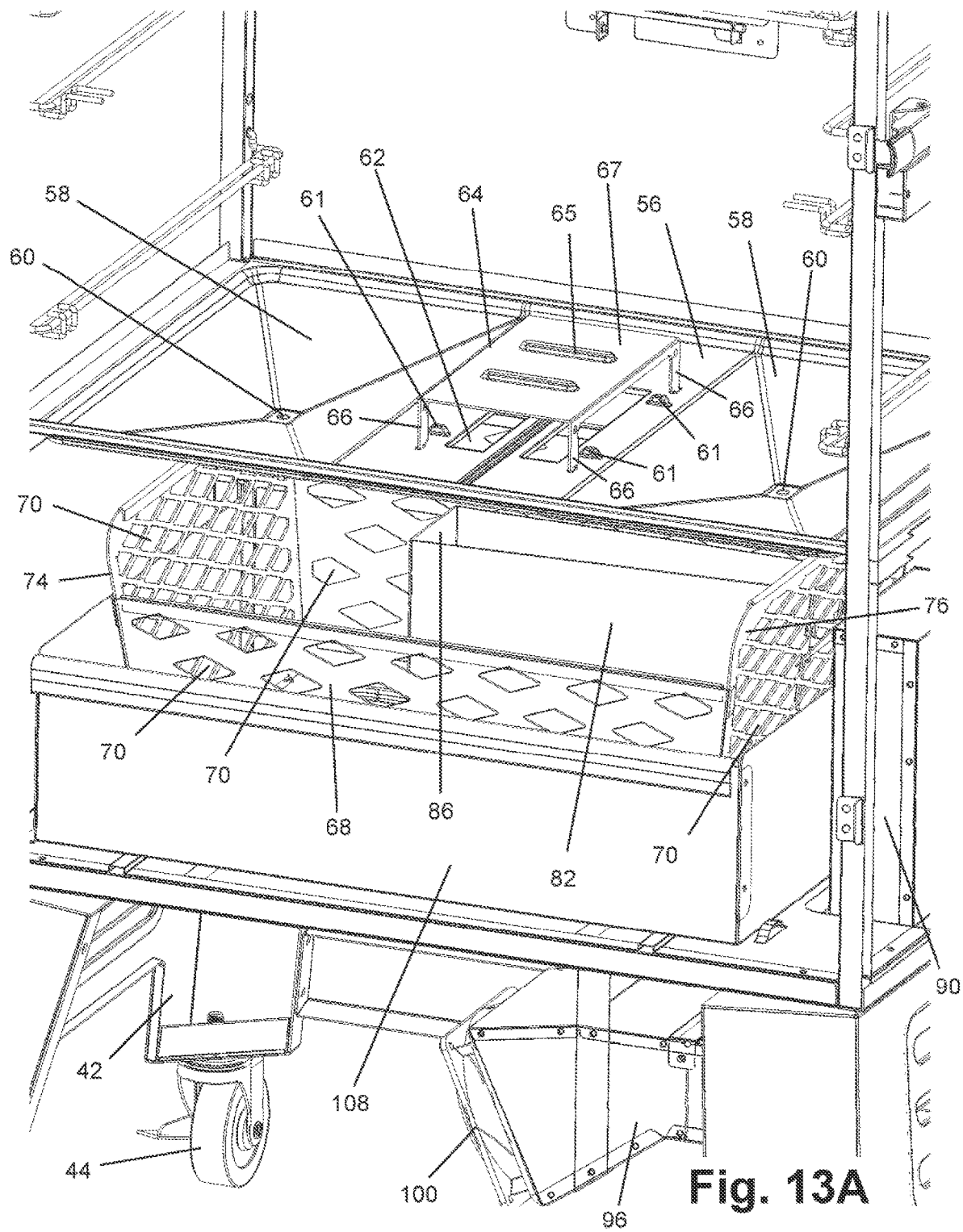
FIG. 13A is an enlarged front perspective view of the grease tray with the heat deflector in its upright position in accordance with certain exemplary embodiments of the present invention.
Figure 13B:
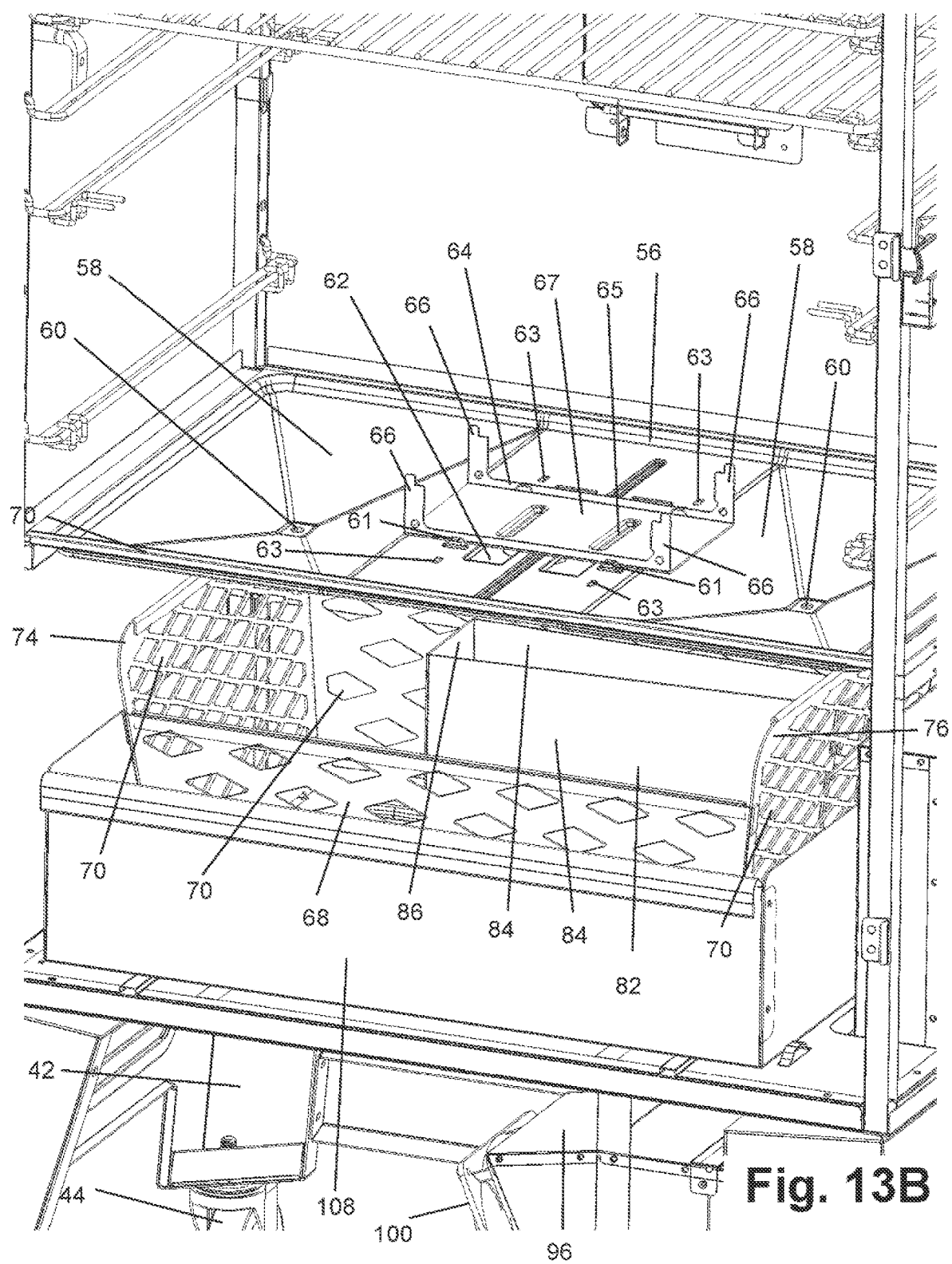
FIG. 13B is an enlarged front perspective view of the grease tray with the heat deflector in its inverted position in accordance with certain exemplary embodiments of the present invention.
Figure 14:
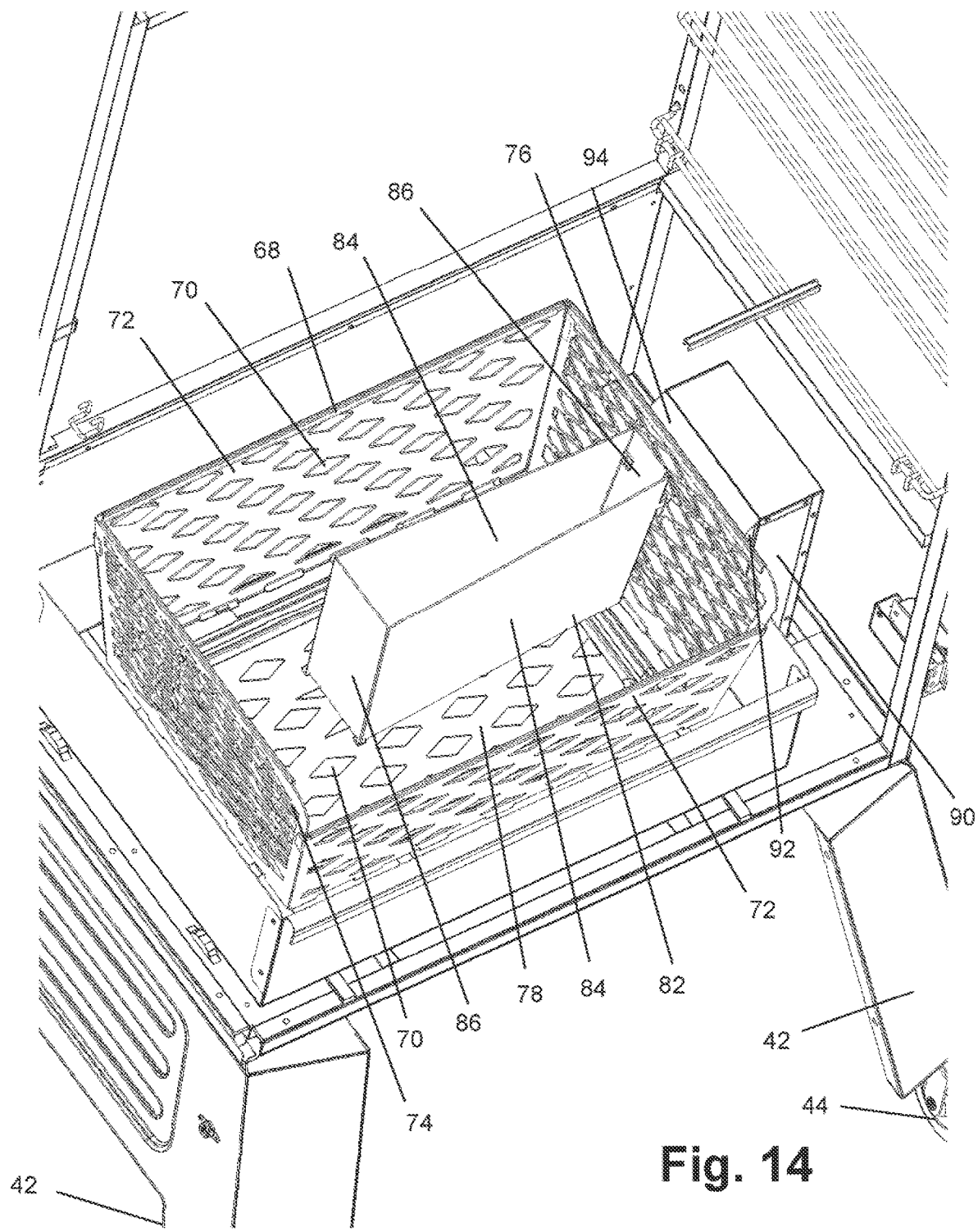
FIG. 14 is an enlarged front perspective view of the temperature controlled charcoal grill and smoker with the doors, control panel, grill racks, water pan rack, water pan, and grease tray removed to show internal details in accordance with certain exemplary embodiments of the present invention.
Figure 15:
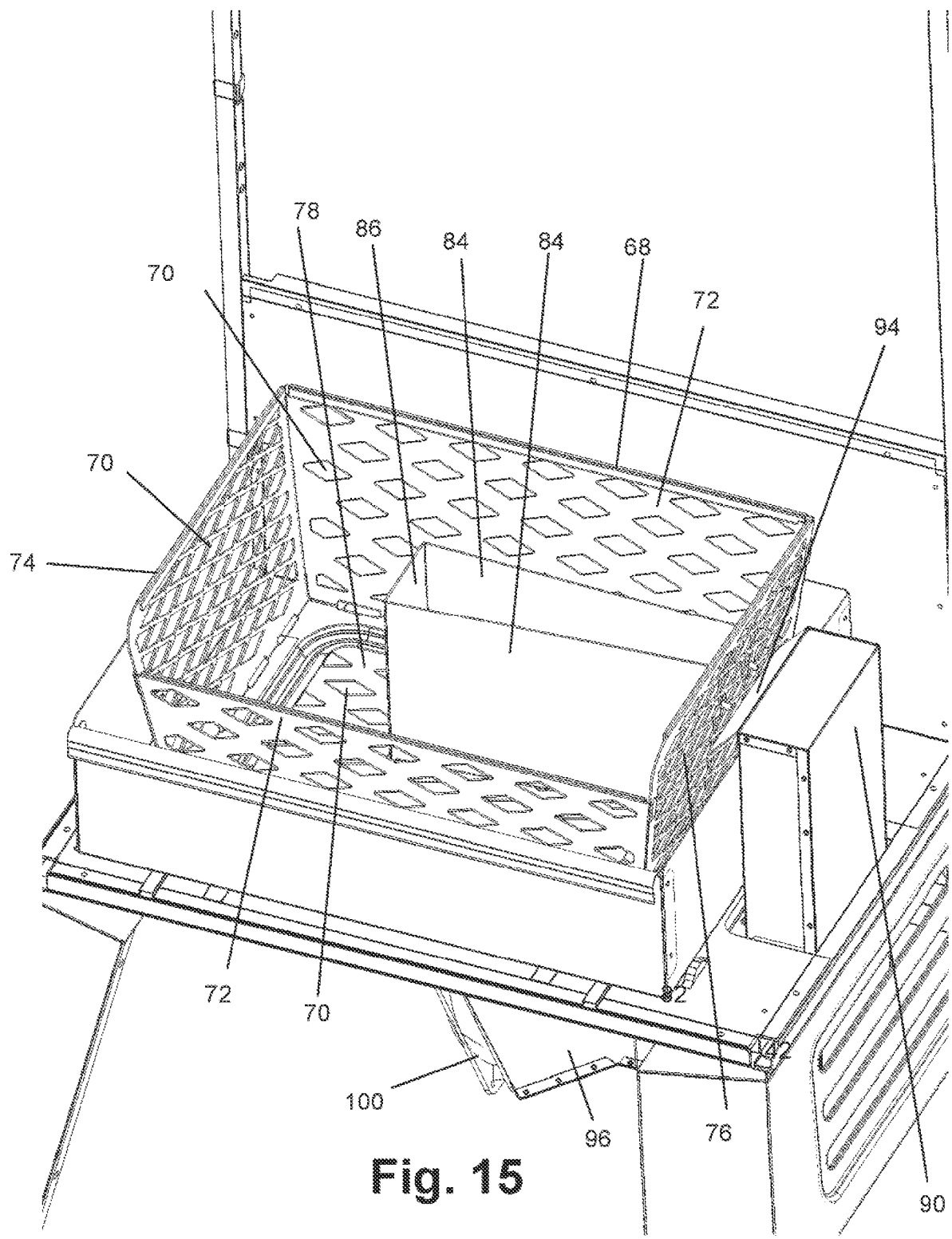
FIG. 15 is an enlarged front perspective view of the temperature controlled charcoal grill and smoker with the doors, control panel, grill racks, water pan rack, water pan, grease tray, and right side removed to show internal details in accordance with certain exemplary embodiments of the present invention.
Figure 16:
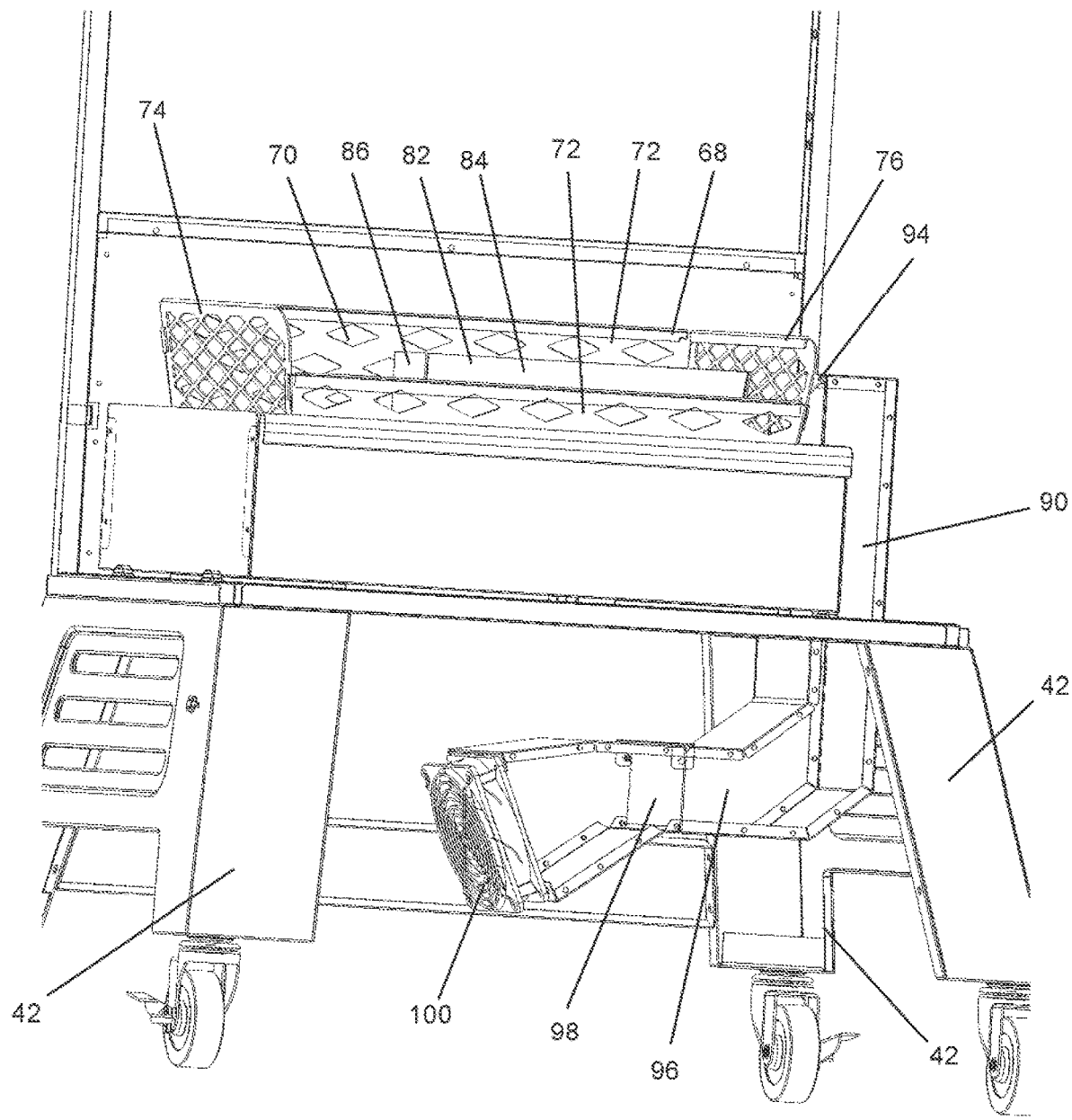
FIG. 16 is an enlarged front perspective view of the temperature controlled charcoal grill and smoker with the doors, control panel, grill racks, water pan rack, water pan, grease tray, and right side removed to show internal details in accordance with certain exemplary embodiments of the present invention.

With reference to FIGS. 13A and 13B, a heat deflector tent 64 may be used to control the amount of heat and smoke that enters the upper food-cooking enclosure 14 through heat transfer openings 62 of the grease tray 56. In the exemplary embodiment, the heat deflector tent 64 has a base plate 67 with elongated dimples 65 and one or more legs 66. The grease tray 56 has slots 63 and blocks 61. In a low temperature mode, for example cooking or smoking below 275° F. (e.g., at approximately from 225° F. to 275° F.), the heat deflector tent 64 may be positioned as FIG. 13B shows. In this case, the heat deflector tent 64 may be positioned with its base plate 67 substantially flat on the grease tray 56 and legs 66 facing upward. In FIG. 13B, the blocks 61 on the grease tray 56 may engage the base plate 67 to restrict movement of the heat deflector tent 64 in a direction from front to back of the grill and smoker 10. The elongated dimples 65 in the base plate 67 may engage the sides of heat transfer openings 62 to restrict movement of the heat deflector tent 64 in a direction from side to side of the grill and smoker 10. When the heat deflector tent 64 is positioned as FIG. 13B shows, the amount of open area in the grease tray 56 for heat and smoke to pass from the lower fuel enclosure 16 into the upper food-cooking enclosure 14 may be approximately 2%.

In a higher temperature cooking mode, such as for example 275° F. and above, the heat deflector tent 64 may be positioned as FIG. 13A shows. In this configuration, the legs 66 of the heat deflector tent 64 engage the slots 63 in the grease tray 56, thereby elevating the base plate 67 of the heat deflector tent 64 above the heat transfer openings 62 and retaining the lateral position of the heat deflector tent 64. When the heat deflector tent 64 is positioned as shown in FIG. 13B, the amount of open area in the grease tray 56 between the upper food-cooking enclosure 14 and the lower fuel enclosure 16 may be approximately 4%.

The divided fuel basket described in the disclosed embodiments can allow for rough adjustment of the cooking or smoking temperature in the grill and smoker 10. For example, for temperatures at or above 275° F., a user may load up to 16 pounds of charcoal briquettes into the fuel basket 68. For cooking temperatures below 275° F., the user may load up to 12 pounds of charcoal briquettes loaded into the fuel grate 68.

Advantageously, the temperature inside the upper food-cooking enclosure 14 can be further controlled by the use of a combination of heat deflector tent 64 above the heat transfer openings 62 in the grease tray 56 and by varying the speed of the fan 100 to control the amount of combustion air supply to the fuel basket 68. Particularly, the grill and smoker 10 has a controller 106 that can control the speed of the fan 100. The controller 106 may receive a target temperature selected by the user on the control panel 104, and may also receive one or more signals indicating the temperature inside the upper food-cooking enclosure 14 from the temperature sensor 102 and/or additional temperature sensors inside the food-cooking enclosure. Based on the target temperature and a measured temperature inside the upper food-cooking enclosure 14, the controller 106 may adjust the speed of the fan accordingly to either lower or raise the temperature within limits inside the upper food-cooking enclosure 14. For example, if the controller 106 determines that the measured temperature is less than the target temperature by more than a first predetermined amount or percentage, then the controller may send one or more control signals to the fan or a fan controller to increase the speed of the fan or turn on the fan and thus increase the cooking or smoking temperature. Conversely, if the controller 106 determines that the measured temperature is above the target temperature by more than a second predetermined amount or percentage, the controller may send one or more control signals to the fan or a fan controller to decrease the speed of the fan or turn off the fan, to cause a decrease in the cooking or smoking temperature in the food-cooking enclosure 14. In some embodiments, the first predetermined amount or percentage and the second predetermined amount or percentage may be the same.

The top door 32 and/or the bottom door 38 may be coupled with at least one sensor (not shown) configured to generate a signal indicative of whether the door is open. The fan 100 may be configured to automatically turn on only if both of the top and bottom doors are closed. In some embodiments, the controller 106 may be configured to receive input signals from one or more sensors coupled to the top and bottom doors 32 and 38 to determine if both doors are closed before the controller 106 may send one or more digital or analog control signals to cause the fan 100 to turn on.

The following examples illustrate cooking with the exemplary grill and smoker 10 as described in the disclosed embodiments.

Example 1

For Cooking at Approximately 225° F.
1. Insert a charcoal grate divider 82 into the fuel basket 68.
2. Place the heat deflector tent 64 in the position shown in FIG. 13B (e.g., resulting in the grease tray 56 having approximately 2% open areas for heat and smoke to pass).
3. Load wood chunks into the center of the charcoal divider 82 or directly into the fuel grate 68 for added smoke flavor.
4. Load up to 12 pounds of charcoal into the fuel basket 68.
5. Load one or more fire starters into the fuel basket 68, for example in a dedicated compartment or area of the fuel basket configured to hold the fire-starter material.
6. Load the nested ash bowl 108, fuel grate 68, and divider 82 into the grill and smoker 10 through the bottom door 38.
7. After loading food onto cooking racks and/or hooks in the upper food-cooking enclosure 14, close the top door 32 of the grill and smoker 10.
8. Light the fire starters and carefully push the ash bowl 108 into the lower fuel enclosure 16 of the grill and smoker 10.
9. Leave the bottom door 38 open until the fire starters have caught fire, for example waiting for around three minutes.
10. After the fire starters are fully ignited, shut the bottom door 38.
11. Set temperature to 225° F. on the control panel 104.
12. Allow the grill and smoker 10 to preheat to the set temperature.
13. When cooking is complete, set the temperature to 400° F. and allow the wood and charcoal fuel loaded in the fuel basket 68 to burn out.

Example 2

For Cooking Between Approximately 230° F. and 270° F.
1. Insert a charcoal grate divider 82 into the fuel grate 68.
2. Place the heat deflector tent 64 in the position shown in FIG. 13A (e.g., resulting in the grease tray 56 having approximately 4% open areas for heat and smoke to pass).
3. Load wood chunks into the center of the charcoal divider 82 or directly into the fuel grate 68 for added smoke flavor.
4. Load up to 12 pounds of charcoal into the fuel basket 68.
5. Load one or more fire starters into the fuel basket 68, for example in a dedicated compartment or area of the fuel basket configured to hold the fire-starter material.
6. Load the nested ash bowl 108, fuel grate 68, and divider 82 into the grill and smoker 10 through the bottom door 38.
7. After loading food onto cooking racks and/or hooks in the upper food-cooking enclosure 14, close the top door 32 of the grill and smoker 10.
8. Light the fire starters and carefully push the ash bowl 108 into the lower fuel enclosure 16 of the grill and smoker 10.
9. Leave the bottom door 38 open until the fire starters have caught fire, for example waiting for around three minutes.
10. After the fire starters are fully ignited, shut the bottom door 38.
11. Set temperature to a temperature between 230° F. to 270° F. on the control panel 104.
12. Allow the grill and smoker 10 to preheat to the set temperature.
13. When cooking is complete, set the temperature to 400° F. and allow the wood and charcoal fuel loaded in the fuel basket 68 to burn out.

Example 3

For Cooking Approximately 275° F. and Above
1. Do not use a charcoal grate divider 82.
2. Place the heat deflector tent 64 in the position shown in FIG. 13A (e.g., resulting in the grease tray 56 having approximately 4% open areas for heat and smoke to pass).
3. Load up to 16 pounds of charcoal into the fuel basket 68.
4. Load one or more fire starters into the fuel basket 68, for example in a dedicated compartment or area of the fuel basket configured to hold the fire-starter material.
5. Load the nested ash bowl 108 and nested fuel basket 68 into the grill and smoker 10 through the bottom door 38.
6. After loading food onto cooking racks and/or hooks in the upper food-cooking enclosure 14, close the top door 32 of the grill and smoker 10.
7. Light the fire starters and carefully push the ash bowl 108 into the lower fuel enclosure 16 of the grill and smoker 10.
8. Leave the bottom door 38 open until the fire starters have caught fire, for example waiting for around three minutes.
9. After the fire starters are fully ignited, shut the bottom door 38.
10. Set temperature to 275° F. or above on the control panel 104.
11. Allow the grill and smoker 10 to preheat to the set temperature.

12. When cooking is complete, set the temperature to 400° F. and allow the charcoal fuel loaded in the fuel basket 68 to burn out.

Other Operational Features of the Exemplary Disclosed Embodiments

1. The grill and smoker 10 may have a temperature range from 225° F. to 400° F.
2. The controller 106 may be configured to control the fan speed so that the grill and smoker 10 does not get cooler during a cooking or smoking process. For example, if the temperature is set to 300° F. and the grill and smoker 10 is allowed to preheat, the controller 106 will not allow the temperature to be lowered to 225° F. during the cooking or smoking process.
3. In some embodiments if a charcoal grate divider 82 is inserted into the fuel basket 68, the upper food-cooking enclosure 14 may not reach a temperature above 275° F.
4. For faster preheat time, the user may allow the grill and smoker 10 to preheat without the heat deflector tent 64 installed. In such embodiments, once the upper food-cooking enclosure 14 reaches the set temperature, the user may insert the heat deflector tent 64 in the location and a configuration as described in the examples above.

In the disclosed embodiments, the controller 106 (which also may be referred to as control unit 106) may comprise one or more physical processors, such as a microprocessor, microcontroller, digital signal processor, field programmable gate array, application specific integrated circuit, or the like, and may further include at least one non-transitory memory device for storing associated software or firmware, configured to control at least some operations of the one or more physical processors in accordance with the disclosed embodiments described herein. The controller 106 also comprises a plurality of input/output ("I/O") connections, for example interconnected with the one or more physical processors by a system bus, for communicating with other components in the temperature controlled charcoal grill and smoker 10. The controller 106 may, among other things, receive various user inputs and sensor signals and transmit control signals to the fan 100, or a separate fan controller (not shown) coupled to the fan 100, and other components in accordance with the disclosed embodiments described herein.

More generally, the controller 106 may be configured to control the fan speed, and thus the temperature inside the food-cooking enclosure, using any known control technique, including but not limited to closed-loop control using one or more temperature-measurement signals, e.g., from the temperature sensor 102. The controller 106 may include at least one processor and a memory that stores computer-executable instructions that, when executed by the at least one processor, comprises a software program that implements an appropriate control algorithm based on various sensor measurements received by the controller 106, such as from one or more ambient-air temperature sensors and/or meat-probe temperature sensors.

In some embodiments, the controller 106 also may have additional functions, such as receiving user input from the control panel 104 and/or communicating with a remote user device or remote computer as discussed further below with reference to FIG. 17. The controller 106 may include a display (not shown) for displaying temperature measurements or other information to the user. In some embodiments, the display may be a touch screen through which the user can input information, such as a target temperature.

The controller 106 preferably comprises at least one wireless transceiver configured to wirelessly communicate with one or more remote devices using any conventional wireless protocols, such as Bluetooth, ZigBee, or other protocols known in the art. The controller 106 also may include a wireless transceiver configured to communicate with over an IEEE 802.11 ("Wi-Fi") network, a cellular network, or any other wireless network. Those skilled in the art will appreciate each wireless transceiver in the controller 106 is coupled to one or more respective antennas and other transmitter and receiver circuitry required to effect wireless communications. In some embodiments, the at least one wireless transceiver may be further configured to wirelessly communicate with the fan 100 or a fan controller (not shown) coupled to the fan 100. In some embodiments, the controller 106 also may be connected over wired connections to one or more sensors (e.g., one or more meat probes or temperature sensors), the fan 100, or other components in the grill and smoker 10, depending on the controller's relative proximity to those components.

Figure 17:
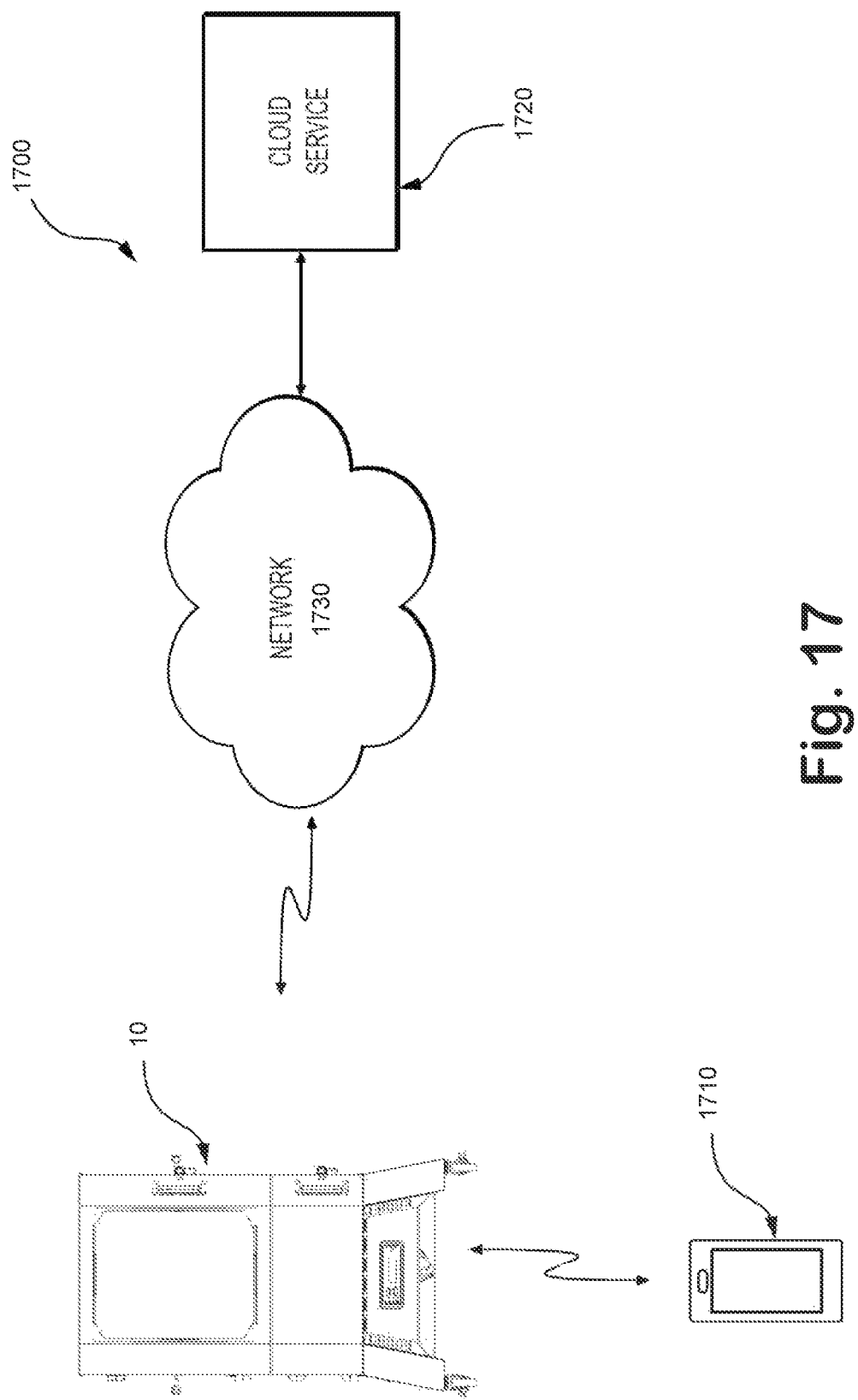
FIG. 17 is a schematic diagram illustrating an exemplary network architecture in which the temperature controlled charcoal grill and smoker may be configured to wirelessly communicate with a user device and also wirelessly communicate via a network with one or more remote computers, for example that provide a cloud service in a cloud computing platform, in accordance with certain exemplary embodiments of the present invention.

FIG. 17 is a schematic diagram illustrating an exemplary network architecture 1700 in which the grill and smoker 10 may be configured to wirelessly communicate with a user device 1710 and also may be configured to wirelessly communicate via a network 1730 with one or more remote computers that provide a cloud service 1720 in a cloud computing platform in accordance with certain disclosed embodiments. For example, the user may have a mobile device, such as a smartphone, tablet, laptop, or other user equipment, or another type of remote device, such as a desktop or appliance, that can establish a wireless connection with the controller 106. The user device 1710 may be configured to communicate with the controller 106 over a peer-to-peer wireless connection, such as over a Bluetooth connection, or over a local area network, such as a Wi-Fi network.

The controller 106 also may establish a network connection with one or more remote servers through a network 1730, which may be a public network such as the Internet. For example, the controller 106 may be configured to communicate packet-based information with one or more remote servers using Internet protocols, such as HTTP and TCP/IP. In some embodiments, the controller 106 preferably accesses at least one cloud-based service 1720 on the one or more remote servers through the network 1730. The cloud-based service 1720 may provide certain database services for managing data collected by sensors in the grill and smoker 10 and other information generated or collected by the controller 106 or other components in the grill and smoker 10. In addition, the cloud-based service 1720 may provide data, commands, and/or instructions to the controller 106, for example, that may be used by the control unit to implement a strategy for controlling an amount of air flow in the upper food-cooking enclosure 14 by controlling a speed of the fan 100.

In some embodiments, the controller 106 may be configured to receive user inputs from the user device 1710 rather than from the control panel 104. For example, the user device 1710 may execute an application that provides a user interface which allows the user to input selections, for example, for setting a target temperature inside the food-cooking enclosure 14. The user device 1710 may be configured to transmit such user inputs over the wireless connection to the controller 106, which processes the received user inputs in the same way as it would if they had been received directly from user-interface elements on the control panel 104. For example, the user may select a target temperature for the food-cooking enclosure using the application on the user device 1710, then the user device 1710 may send the user's selected target temperature to the controller 106 over a Bluetooth connection or a Wi-Fi network.

Those skilled in the art will also appreciate that other modifications and alternatives may be implemented in accordance with the exemplary embodiments described herein. For example, the controller 106 may have other functionality in addition to those exemplary processes and components described herein. For instance, it will be apparent to those skilled in the art that various processor and memory types, including various computer-readable media, may be used, for example to implement the controller 106 and/or control panel 104, to store and execute program instructions pertaining to the techniques described herein. In other embodiments, the controller 106 may be responsive to touch or voice commands, or receive instructions through an integrated cloud-based voice program (e.g., Amazon Alexa, Google Assistant, Microsoft Cortana, or Apple Siri).

While this invention has been described with reference to preferred embodiments thereof, it is to be understood that variations and modifications can be affected within the spirit and scope of the invention as described herein and as described in the appended claims. Accordingly, this description is to be taken only by way of example and not to otherwise limit the scope of the exemplary disclosed embodiments herein. Therefore, it is the object of the appended claims to cover all such variations and modifications as come within the true spirit and scope of the embodiments disclosed herein.

We claim:

1. A temperature controlled grill and smoker, comprising:
   a fuel enclosure comprising a fuel basket configured to hold one or more types of solid fuel, the fuel basket having holes that allow air to pass into the fuel basket to the one or more types of solid fuel;
   a fan disposed below the fuel enclosure, wherein the fan is configured to selectively provide air into the fuel basket;
   an air column disposed within the fuel enclosure and adjacent to the fuel basket, the air column comprising one or more openings and configured to receive the air from the fan and provide the air to the fuel basket through the one or more openings;
   a controller configured to cause the fan to deliver the air through the air column and into the fuel basket; and
   a food-cooking enclosure located above the fuel enclosure, the food-cooking enclosure comprising:
      a cooking rack for holding a food product; and
      a tray located below the cooking rack and above the fuel enclosure, the tray configured to collect grease drippings from the food product and direct the drippings into the fuel enclosure, the tray including one or more openings that allow smoke and heat generated from solid fuel in the fuel basket to enter the food-cooking enclosure; and
      a heat deflector tent mounted above the one or more openings in the tray.

2. The temperature controlled grill and smoker of claim 1, further comprising a divider configured to partition an interior of the fuel basket into at least first and second sections, wherein a first type of solid fuel can be placed in the first section and a second type of solid fuel can be placed in the second section within the fuel basket.

3. The temperature controlled grill and smoker of claim 1, wherein the heat deflector tent comprises a substantially flat surface, and the heat deflector tent is configured to be mounted above the one or more openings in the tray by covering at least a portion of the one or openings in the tray with the heat deflector tent's substantially flat surface.

4. The temperature controlled grill and smoker of claim 1, wherein the heat deflector tent comprises a substantially flat surface connected to one or more legs, and the heat deflector tent is configured to be mounted above the one or more openings in the tray with its one or more legs extending downwards toward the tray so that the heat deflector tent's substantially flat surface is elevated above the one or more openings in the tray.

5. The temperature controlled grill and smoker of claim 4, wherein the heat deflector tent is configured to be mounted above the one or more openings in the tray with its one or more legs extending downwards toward the tray so that the heat deflector tent's substantially flat surface is elevated above the one or more openings in the tray when cooking the food product at temperatures approximately 275° F. and above.

6. The temperature controlled grill and smoker of claim 4, wherein the heat deflector tent is further configured to be mounted above the one or more openings in the tray by covering at least a portion of the one or openings in the tray with the heat deflector tent's substantially flat surface when cooking the food product at temperatures approximately between 220° F. and 275° F.

7. The temperature controlled grill and smoker of claim 1, wherein the controller is configured to determine a speed of the fan based on a target temperature input by a user through one or more user-interface elements on a control panel coupled to the controller.

8. The temperature controlled grill and smoker of claim 1, wherein the controller is configured to determine a speed of the fan based on a target temperature received from a remote user device over a wireless connection.

9. The temperature controlled grill and smoker of claim 1, wherein the fuel enclosure further comprises an ash bowl and the fuel basket is nested within the ash bowl.

10. The temperature controlled grill and smoker of claim 9, wherein the ash bowl and the nested fuel basket are removable as a single unit through a door in the fuel enclosure.

11. A temperature controlled grill and smoker, comprising:
   a fuel enclosure comprising a fuel basket configured to hold one or more types of solid fuel, the fuel basket having holes that allow air to pass into the fuel basket to the one or more types of solid fuel;
   a fan disposed below the fuel enclosure, wherein the fan is configured to selectively provide air into the fuel basket;
   an air column disposed within the fuel enclosure and adjacent to the fuel basket, the air column comprising one or more openings and configured to receive the air from the fan and provide the air to the fuel basket through the one or more openings;
   a controller configured to cause the fan to deliver the air through the air column and into the fuel basket; and
   a temperature sensor configured to generate a signal corresponding to a measured temperature in the food-cooking enclosure, wherein the controller is further configured to:
      receive the signal corresponding to the measured temperature from the temperature sensor;

receive an indication of a target temperature associated with the measured temperature;

determine whether the measured temperature is less than the target temperature;

determine that a speed of the fan should be increased or the fan turned on if the controller has determined that the measured temperature is less than the target temperature by a first predetermined amount or percentage; and determine that the speed of the fan should be decreased or the fan turned off if the controller has determined that the measured temperature is greater than the target temperature by a second predetermined amount or percentage.

12. The temperature controlled grill and smoker of claim 11, wherein the first predetermined amount or percentage and the second predetermined amount or percentage are the same.

13. A temperature controlled grill and smoker, comprising:

a fuel enclosure comprising a fuel basket configured to hold one or more types of solid fuel, the fuel basket having holes that allow air to pass into the fuel basket to the one or more types of solid fuel;

a fan disposed below the fuel enclosure, wherein the fan is configured to selectively provide air into the fuel basket;

an air column disposed within the fuel enclosure and adjacent to the fuel basket, the air column comprising one or more openings and configured to receive the air from the fan and provide the air to the fuel basket through the one or more openings; and a controller configured to cause the fan to deliver the air through the air column and into the fuel basket, wherein the fan is configured to deliver the air through an air duct or manifold, wherein the air duct or manifold includes a damper configured to change positions based on a speed of the fan.

14. A temperature controlled grill and smoker, comprising:

a fuel enclosure comprising a fuel basket configured to hold one or more types of solid fuel, the fuel basket having holes that allow air to pass into the fuel basket to the one or more types of solid fuel;

a fan disposed below the fuel enclosure, wherein the fan is configured to selectively provide air into the fuel basket;

an air column disposed within the fuel enclosure and adjacent to the fuel basket, the air column comprising one or more openings and configured to receive the air from the fan and provide the air to the fuel basket through the one or more openings; and a controller configured to cause the fan to deliver the air through the air column and into the fuel basket; and an air deflector attached to the air column and configured to direct the air from the fan into the fuel basket.

15. A temperature controlled grill and smoker, comprising:

a. a fuel enclosure comprising:

i. A fuel basket configured to hold first and second types of solid fuel, the fuel basket having holes that allow air to pass into the fuel basket to the first and second types of solid fuel; and b. a food-cooking enclosure located above the fuel enclosure, comprising:

i. A cooking rack for holding a food product; and ii. a tray located below the cooking rack and above the fuel enclosure, the tray configured to collect grease drippings from the food product and direct the drippings into the fuel enclosure, the tray including one or more openings that allow smoke and heat from the first and second types of solid fuel in the fuel basket to enter the food-cooking enclosure; and iii. a heat deflector tent mounted above the one or more openings in the tray; and c. a fan configured to provide combustion air into the fuel basket.

16. The temperature controlled grill and smoker of claim 15, further comprising a divider for partitioning an interior area of the fuel basket for the first and second types of solid fuel.

17. The temperature controlled grill and smoker of claim 15, wherein the divider is substantially rectangular shaped.

18. The temperature controlled grill and smoker of claim 15, wherein the first type of solid fuel is wood and the second type of solid fuel is charcoal.

19. The temperature controlled grill and smoker of claim 15, wherein the fuel basket has around 30% to 40% open space on its surfaces as a result of the holes.

20. A temperature controlled grill and smoker, comprising:

a. a fuel enclosure comprising a fuel basket configured to hold one or more types of solid fuel, the fuel basket having holes configured to allow air to pass into the fuel basket to the one or more types of solid fuel;

b. a food-cooking enclosure located above the fuel enclosure, comprising:

i. a cooking rack for holding a food product;

ii. a tray located below the cooking rack and above the fuel enclosure, the tray configured to collect grease drippings from the food product and direct the drippings into the fuel enclosure, the tray including one or more openings that allow smoke and heat from the one or more types of solid fuel in the fuel basket to enter the food-cooking enclosure; and iii. a heat deflector tent comprising a substantially flat surface mounted above the one or more openings in the tray, wherein the heat deflector tent is configured to be mounted above the one or more openings in a first configuration having its substantially flat surface elevated above the one or more openings in the tray and in a second configuration having its substantially flat surface covering at least a portion of the one or more openings in the tray.

* * * * *